United States Patent
Zhou et al.

(10) Patent No.: US 8,619,866 B2
(45) Date of Patent: Dec. 31, 2013

(54) REDUCING MEMORY BANDWIDTH FOR PROCESSING DIGITAL IMAGE DATA

(75) Inventors: Minhua Zhou, Plano, TX (US); Ching-Yu Hung, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 383 days.

(21) Appl. No.: 12/572,768

(22) Filed: Oct. 2, 2009

(65) Prior Publication Data

US 2011/0080956 A1    Apr. 7, 2011

(51) Int. Cl.
*H04N 7/12* (2006.01)
*H04N 11/02* (2006.01)
*H04N 11/04* (2006.01)

(52) U.S. Cl.
USPC ............ 375/240.24; 375/240; 348/384.1; 348/419.1; 345/543; 345/555; 345/545; 345/547; 345/556

(58) Field of Classification Search
USPC ........ 375/240.01–240.29, 240; 345/421, 555, 345/543, 544, 545, 547, 556, 565; 348/84.1, 419.1, 424.2, 431.1
See application file for complete search history.

(56) References Cited

U.S. PATENT DOCUMENTS

| | | | | |
|---|---|---|---|---|
| 6,492,991 | B1 * | 12/2002 | Morein et al. | 345/555 |
| 2003/0038803 | A1 * | 2/2003 | Morein et al. | 345/421 |
| 2010/0150223 | A1 * | 6/2010 | Nagaraj et al. | 375/240.01 |
| 2010/0226435 | A1 * | 9/2010 | Riemens et al. | 375/240.16 |

OTHER PUBLICATIONS

Ying Chen, et al., U.S. Appl. No. 12/572,408, "Line-Based Compression for Digital Image Data," filed Oct 2, 2009, pp. 1-69.

* cited by examiner

*Primary Examiner* — Sath V Perungavoor
*Assistant Examiner* — Nathnael Aynalem
(74) *Attorney, Agent, or Firm* — Mima Abyad; W. James Brady; Frederick J. Telecky, Jr.

(57) ABSTRACT

A method for processing digital image data is provided that includes compressing a block of the digital image data to generate a compressed block, storing the compressed block in an external memory when a number of bits in the compressed block does not exceed a first compression threshold, and storing the block in the external memory when the number of bits in the compressed block exceeds the first compression threshold.

22 Claims, 12 Drawing Sheets

REDUCING MEMORY BANDWIDTH FOR PROCESSING DIGITAL IMAGE DATA

BACKGROUND OF THE INVENTION

Digital image and video capture and playback has become a standard feature in many handheld consumer electronic products such as digital still cameras (DSCs), cellular phones telephone, digital video cameras, and PDAs. As processors for such devices become more powerful, the market requires higher and higher image and video resolution. For example, real-time video at VGA (640×480) or D1 (720×480) resolution is a common requirement. Further, image and video resolution will soon reach HD (1080p@30, 1920×1080). One challenge for manufacturers of handheld consumer electronic products is cost effectively supporting the tremendous memory bandwidth (speed) needed for the ever increasing digital image data resolution.

In many handheld consumer electronic products, video raw data is captured by a sensor and fed into a preview engine for processing. After processing, the resulting video sequence is stored in an external (i.e., off-chip) memory. A video encoder then fetches the video sequence from the external memory to encode it. In addition, during encoding, the video encoder both encodes a picture and stores a decoded copy of the picture in the external memory for use in prediction of a subsequent picture. The video encoder then fetches the decoded copy from the external memory when needed to perform prediction. Thus, the video encoder is fetching both pictures to be encoded and prior pictures from external memory to perform the encoding, and storing prior pictures in the external memory.

The real-time video data transfer from the preview engine to external memory and to and from external memory to the video encoder requires a lot of memory bandwidth if the video resolution is D1 (720×480) or higher. However, memory bandwidth is limited in many digital video products due to both cost and power constraints. Accordingly, reducing memory bandwidth requirements for processing video data is desirable.

BRIEF DESCRIPTION OF THE DRAWINGS

Particular embodiments in accordance with the invention will now be described, by way of example only, and with reference to the accompanying drawings.

DETAILED DESCRIPTION OF EMBODIMENTS OF THE INVENTION

Figure 1:
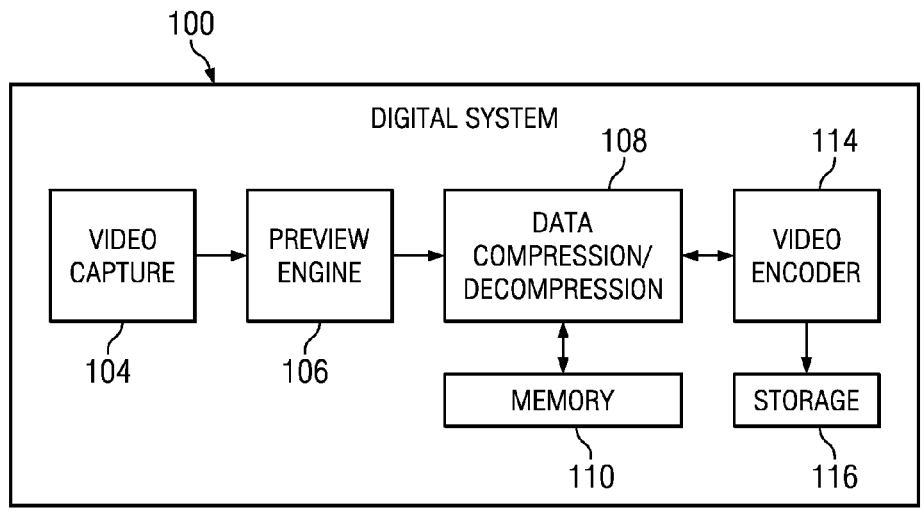
FIG. 1 shows a block diagram of a digital system in accordance with one or more embodiments of the invention.

Specific embodiments of the invention will now be described in detail with reference to the accompanying figures. Like elements in the various figures are denoted by like reference numerals for consistency.

Certain terms are used throughout the following description and the claims to refer to particular system components. As one skilled in the art will appreciate, components in digital systems may be referred to by different names and/or may be combined in ways not shown herein without departing from the described functionality. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" and derivatives thereof are intended to mean an indirect, direct, optical, and/or wireless electrical connection. Thus, if a first device couples to a second device, that connection may be through a direct electrical connection, through an indirect electrical connection via other devices and connections, through an optical electrical connection, and/or through a wireless electrical connection.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description. In addition, although method steps may be presented and described herein in a sequential fashion, one or more of the steps shown and described may be omitted, repeated, performed concurrently, and/or performed in a different order than the order shown in the figures and/or described herein. Accordingly, embodiments of the invention should not be considered limited to the specific ordering of steps shown in the figures and/or described herein. Further, while various embodiments of the invention are described herein in accordance with the H.264 video coding standard, embodiments for other video coding standards will be understood by one of ordinary skill in the art. Accordingly, embodiments of the invention should not be considered limited to the H.264 video coding standard.

As used herein, the term digital image data refers to pixels in a single digital image or in a digital video sequence. The pixels may be all or a subset of a single digital image or may be all or a subset of a frame/picture in a digital video sequence, and may be have one or multiple color components. Accordingly, although various embodiments of the invention are described herein in reference to processing of digital video sequences, embodiments for processing of digital still images will be understood by one of ordinary skill in the art.

In general, embodiments of the invention provide for compression and decompression of digital image data to reduce memory bandwidth requirements for processing of the digital image data. More specifically, in one or more embodiments of the invention, to compress digital image data, the digital image data is divided into blocks, and each block is compressed using a compression technique (e.g., variable length coding or fixed length coding). After a block is compressed, the number of bits used to compress the block is compared to a compression threshold. If the number of bits in the compressed block exceeds the compression threshold, the original, uncompressed block is stored in external memory. Otherwise, the compressed block is stored in external memory. In some embodiments of the invention, the uncompressed blocks are stored in an uncompressed data buffer and the compressed blocks are stored in a separate, compressed data buffer.

In addition to storing the compressed/uncompressed block in external memory, as is explained in more detail herein, an indicator is set for use during decompression of the block. In some embodiments of the invention, the indicator is an uncompressed block marker stored in the compressed data buffer to indicate that the corresponding block of the digital image data is uncompressed and stored in the uncompressed data buffer. In other embodiments of the invention, the indicator is a compression flag corresponding to the block in a compression flag buffer whose value indicates whether or not the corresponding block is compressed or uncompressed. In some embodiments of the invention, as is explained in more detail herein, multiple compression thresholds are used and the compression flag also indicates which compression threshold the number of bits in the compressed block does not exceed.

FIG. 1 shows a block diagram of a digital system in accordance with one or more embodiments of the invention. The digital system is configured to perform compression and decompression of digital image data using embodiments of the methods for compression and decompression described herein. The digital system (100) includes a video capture component (104), a preview engine (106), a data compression/decompression component (108), a memory component (110), a video encoder component (114), and a storage component (116). The video capture component (104) is configured to provide digital image data to the preview engine (106). The video capture component (104) may include, for example, an image sensor such as a charge-coupled device (CCD) or a complementary metal-oxide-semiconductor (CMOS) sensor that captures analog image information in the form of pixels. The video capture component may include a color separator to separate pixel-sequential image signals into color-separated pixel signals, such as primary red (R), green (G) and blue (B) signals. The analog color-separated pixel signals are converted to digital image signals and provided to the preview engine (106).

The preview engine (106) includes functionality to perform image pre-processing tasks on the digital input signals. The image pre-processing tasks enhance the quality of the input image and convert it into a format for further processing, e.g., Y/Cb/Cr 4:2:2 format. These tasks may include color filter array (CFA) interpolation, color space conversion, gamma correction, another image enhancement tasks such as noise filtering and RGB blending. After the pre-processing, the digital image data is compressed by the data compression/decompression component (108) and stored in the memory component (110). The compression is performed in accordance with an embodiment of a method for compression described herein. The memory component (110) may be any suitable memory technology such as, for example, synchronous dynamic random access memory (SDRAM).

The video encoder component (114) includes functionality to encode captured, pre-processed digital image data. More specifically, the video encoder component (114) retrieves the digital image data from the memory (110) via the data compression/decompression component (108) and encodes it for storage in the storage component (116). The data compression/decompression component (108) decompresses the digital image data in accordance with an embodiment of a method for decompression as described herein. The storage component (116) may be any suitable storage technology, such as, for example, a secure digital card, an internal hard drive, etc.

In general, the video encoder component (114) retrieves the digital image data from the memory (110) as a sequence of video frames, divides the frames into coding units which may be a whole frame or a slice of a frame, divides the coding units into blocks of pixels, and encodes the digital image data in the coding units based on these blocks. During the encoding process, the video encoder component (114) uses reference data from previously encoded frames to encode subsequent frames. As is explained in more detail in reference to FIG. 2, the reference data is generated after encoding a frame and is stored, via the data compression/decompression component (108), in the memory (110). The data compression/decompression component (108) compresses the reference data before it is stored in the memory (110) in accordance with an embodiment of a method for compression as described herein. When the reference data is needed, the video encoder component (114) retrieves it from the memory (110) via the data compression/decompression component (108). The data compression/decompression component (108) decompresses the reference data prior to providing it to the video encoder component (114) in accordance with an embodiment of a method for decompression as described herein. The functionality of embodiments of the video encoder component (114) is described in more detail below in reference to FIG. 2.

The video encoder component (114) may perform encoding in accordance with a video compression standard such as, for example, the Moving Picture Experts Group (MPEG) video compression standards, e.g., MPEG-1, MPEG-2, and MPEG-4, the ITU-T video compressions standards, e.g., H.263 and H.264, the Society of Motion Picture and Television Engineers (SMPTE) 421 M video CODEC standard (commonly referred to as "VC-1"), the video compression standard defined by the Audio Video Coding Standard Workgroup of China (commonly referred to as "AVS"), etc. The video encoder component (114), the preview engine (106), and the data compression/decompression component (108) may be implemented in any suitable combination of software, firmware, and hardware, such as, for example, one or more digital signal processors (DSPs), microprocessors, discrete logic, application specific integrated circuits (ASICs), field-programmable gate arrays (FPGAs), etc.

Figure 2:
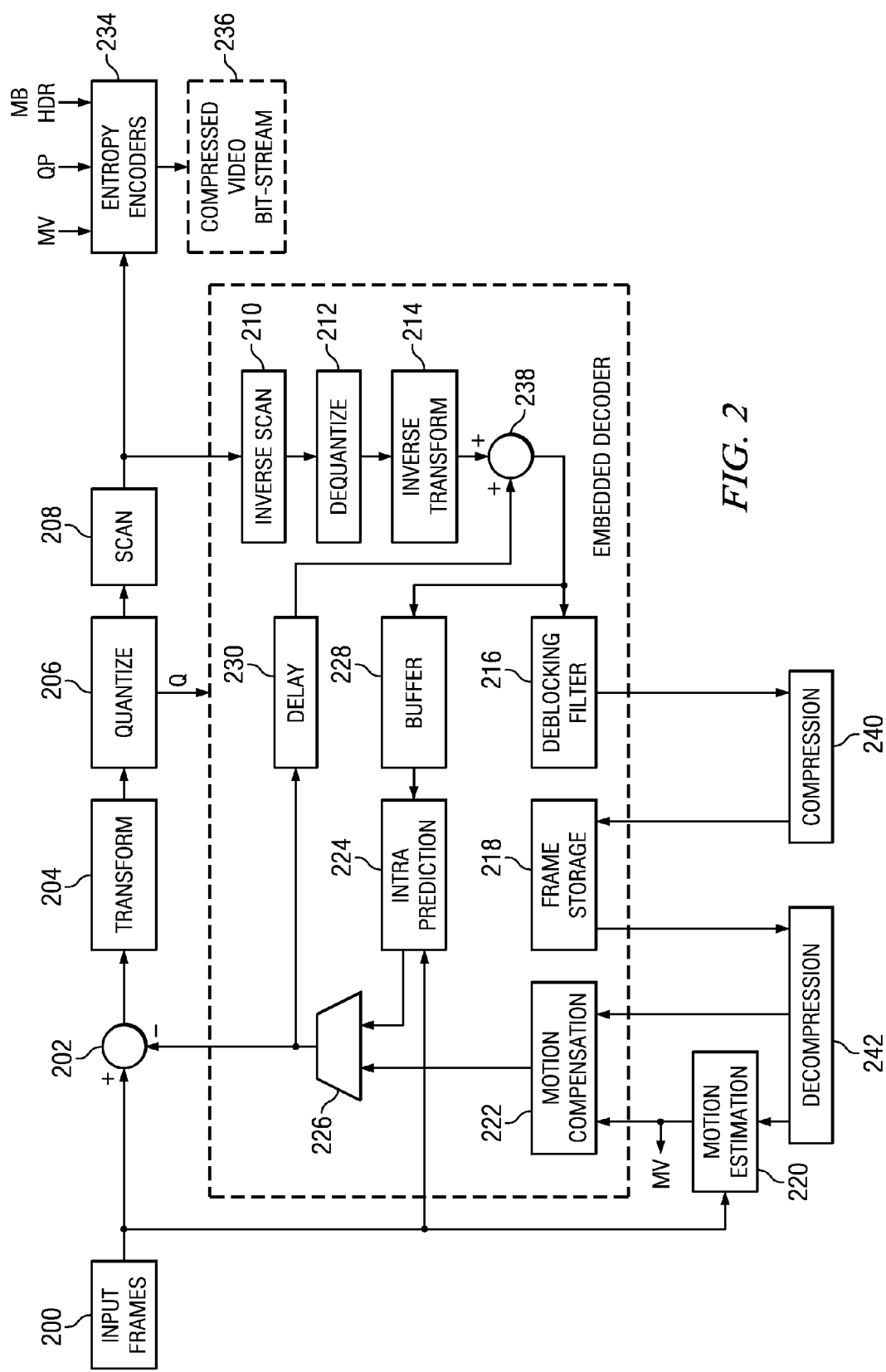
FIG. 2 shows a block diagram of a video encoder in accordance with one or more embodiments of the invention.

FIG. 2 shows a block diagram of a video encoder, e.g., the video encoder (114) of FIG. 1, in accordance with one or more embodiments of the invention. More specifically, FIG. 2 illustrates the basic coding architecture of an H.264 encoder. In the video encoder of FIG. 2, input frames (200) for encoding are provided as one input of a motion estimation component (220), as one input of an intraframe prediction component (224), and to a positive input of a combiner (202) (e.g., adder or subtractor or the like). In one or more embodiments of the invention, to reduce memory bandwidth requirements, the input frames (200) may be stored in compressed format in a memory (not shown) and decompressed prior to being provided to the components of the video encoder. The compression and decompression of the input frames (200) is performed in accordance with methods for compression and decompression as described herein.

The frame storage component (218) provides reference data to the motion estimation component (220) and to the motion compensation component (222). The reference data may include one or more previously encoded and decoded frames. In some embodiments of the invention, to reduce memory bandwidth requirements, the reference data is compressed by the compression component (240) prior to storage in the frame storage component (218) and is decompressed by the decompression component (242) prior to being provided to the motion estimation component (220) and the motion compensation component (222). The compression component (240) performs compression in accordance with an embodiment of a method for compression as described herein and the decompression component (242) performs decompression in accordance with a method for decompression as described herein.

The motion estimation component (220) provides motion estimation information to the motion compensation component (222) and the entropy encoders (234). More specifically, the motion estimation component (220) performs tests based on the prediction modes defined in the H.264 standard to choose the best motion vector(s)/prediction mode. The motion estimation component (220) provides the selected motion vector (MV) or vectors and the selected prediction mode to the motion compensation component (222) and the selected motion vector (MV) to the entropy encoders (234).

The motion compensation component (222) provides motion compensated prediction information to a selector switch (226) that includes motion compensated interframe prediction macroblocks (MBs). The intraframe prediction component (224) also provides intraframe prediction information to switch (226) that includes intraframe prediction MBs and a prediction mode. That is, similar to the motion estimation component (220), the intraframe prediction component (224) performs tests based on prediction modes defined in the H.264 standard to choose the best prediction mode for generating the intraframe prediction MBs.

The switch (226) selects between the motion-compensated interframe prediction MBs from the motion compensation component (222) and the intraframe prediction MBs from the intraprediction component (224) based on the selected prediction mode. The output of the switch (226) (i.e., the selected prediction MB) is provided to a negative input of the combiner (202) and to a delay component (230). The output of the delay component (230) is provided to another combiner (i.e., an adder) (238). The combiner (202) subtracts the selected prediction MB from the current MB of the current input frame to provide a residual MB to the transform component (204). The resulting residual MB is a set of pixel difference values that quantify differences between pixel values of the original MB and the prediction MB. The transform component (204) performs a block transform such as DCT, on the residual MB to convert the residual pixel values to transform coefficients and outputs the transform coefficients.

The transform coefficients are provided to a quantization component (206) which outputs quantized transform coefficients. Because the DCT transform redistributes the energy of the residual signal into the frequency domain, the quantized transform coefficients are taken out of their raster-scan ordering and arranged by significance, generally beginning with the more significant coefficients followed by the less significant by a scan component (208). The ordered quantized transform coefficients provided via a scan component (208) are coded by the entropy encoder (234), which provides a compressed bitstream (236) for transmission or storage. The entropy coding performed by the entropy encoder (234) may be any suitable entropy encoding techniques, such as, for example, context adaptive variable length coding (CAVLC), context adaptive binary arithmetic coding (CABAC), run length coding, etc.

Inside every encoder is an embedded decoder. As any compliant decoder is expected to reconstruct an image from a compressed bitstream, the embedded decoder provides the same utility to the video encoder. Knowledge of the reconstructed input allows the video encoder to transmit the appropriate residual energy to compose subsequent frames. To determine the reconstructed input, i.e., reference data, the ordered quantized transform coefficients provided via the scan component (208) are returned to their original post-DCT arrangement by an inverse scan component (210), the output of which is provided to a dequantize component (212), which outputs estimated transformed information, i.e., an estimated or reconstructed version of the transform result from the transform component (204). The estimated transformed information is provided to the inverse transform component (214), which outputs estimated residual information which represents a reconstructed version of the residual MB. The reconstructed residual MB is provided to the combiner (238).

The combiner (238) adds the delayed selected predicted MB to the reconstructed residual MB to generate an unfiltered reconstructed MB, which becomes part of reconstructed frame information. The reconstructed frame information is provided via a buffer (228) to the intraframe prediction component (224) and to a filter component (216). The filter component (216) is a deblocking filter (e.g., per the H.264 specification) which filters the reconstructed frame information and provides filtered reconstructed frames, i.e., reference data or reference frames, to frame storage component (218). In some embodiments of the invention, the reconstructed frames are compressed by the compression component (240) in accordance with a compression method as described herein prior to providing them to the frame storage component (218).

Figure 3:
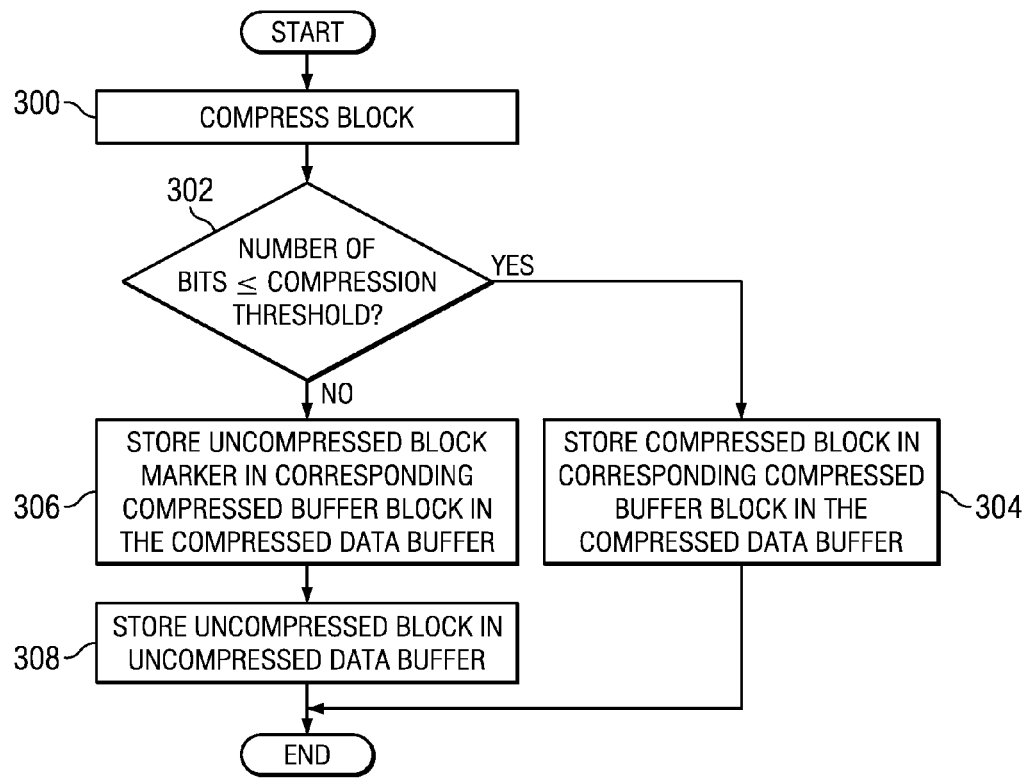
FIGS. 3, 6, 9A, 9B, and 12 show flow diagrams of methods for digital image data compression in accordance with one or more embodiments of the invention.

FIG. 3 shows a flow diagram of a method for compression of digital image data in accordance with one or more embodiments of the invention. The digital image data to be compressed, e.g., a frame or picture in a video sequence, is evenly divided into blocks. The size of the blocks may be any appropriate size. If the pixels in the digital image data are colored, the color components may be compressed separately or jointly. If the color components are compressed separately, the block sizes for each color component may be the same or may be different. As an example, for YUV, 4:2:0, a block may include 16×16 luminance pixels and 8×8 chrominance pixels for each color component if the color components are compressed jointly. In this example, a block would have 384 pixels. In another example, for RGB, 4:4:, a block may include 16×16 R pixels, 16×16 B pixels and 16×16 B pixels if the color components are compressed jointly. In this example, a block would 768 pixels. In one or more embodiments of the invention, the block size is the same as a block size used by the video encoder.

Each block of the digital image is processed using the method of FIG. 3. In one or more embodiments of the invention, the blocks are processed in raster scan order. As shown in FIG. 3, first the block is compressed using any suitable compression technique (300). For example, the compression technique may be a fixed length coding (FLC) technique, a variable length coding (VLC) technique (lossless or lossy), or a combination thereof. Co-pending U.S. patent application Ser. No. 12/572,408, entitled "Line-Based Compression for Digital Image Data," filed on Oct. 2, 2009, provides detailed descriptions of some suitable encoding techniques and is incorporated herein by reference.

The number of bits in the resulting compressed block is then compared to a compression threshold (302). In one or more embodiments of the invention, the compression threshold is based on the block size, the number of bits in a pixel, and the desired compression factor. More specifically, the compression threshold is given by $$T = (M \times N \times nrbits)/f$$

where T is the threshold, M is the width of a block, N is the height of a block, nrbits is the number of bits in a pixel, and f is a compression factor. The compression factor f is chosen such that for most of the blocks, the size of a compressed block, i.e., the number of bits in the compressed block, is less than T. Note that T is always smaller than the original block size.

If the number of bits in the compressed block does not exceed the compression threshold, the compressed block is stored in a compressed data buffer (304) in external memory. Otherwise, as is explained in more detail below, an uncompressed block marker is stored in the compressed data buffer to indicate that the block is not compressed (306) and the uncompressed block is stored in a separate, uncompressed data buffer (308) in the external memory. In some embodiments of the invention, a location indicator for the uncompressed block in the uncompressed data buffer is also stored in the compressed data buffer. The location indicator may be, for example, a pointer to the uncompressed block, an offset of the uncompressed block in the uncompressed data buffer, or any other representation for indicating where the uncompressed block is stored in the uncompressed data buffer.

Figure 4A:
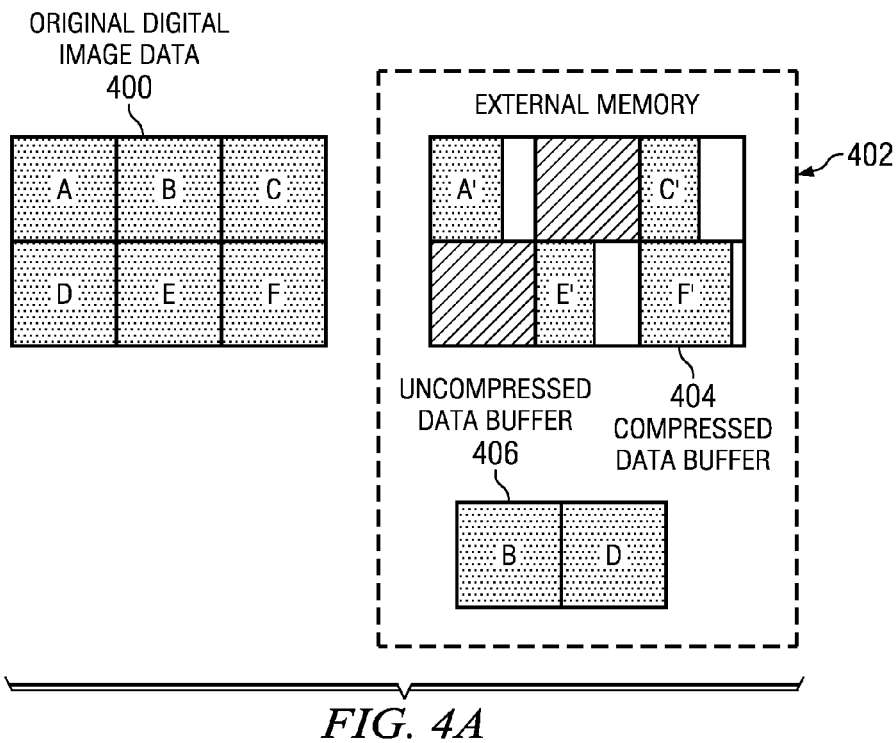
FIGS. 4A, 4B, 7A, 7B, 10, and 13 show examples of storage of digital image data in accordance with one or more embodiments of the invention.

More specifically, as shown in the example of FIG. 4A, in one or more embodiments of the invention, compressed blocks of digital image data are stored in raster scan order in a compressed data buffer (404) in external memory (402), and uncompressed blocks of digital image data are stored a separate, uncompressed data buffer (406) in external memory (402). The compressed data buffer (404) may be implemented using any suitable buffer management technique, such as a circular buffer, a sequential list, a linked list, an array, etc. Each entry in the compressed data buffer (404) is a block of consecutive memory locations, i.e., a compressed buffer block, and is sized to store the compression threshold number of bits. For example, if the compression threshold number of bits is T, each compressed buffer block is sized to store T bits. That is, a compressed buffer block includes a number of memory locations equal to T divided by the memory location size and rounded up to the next integer. In some embodiments of the invention, the number of memory locations in a compressed buffer block is also rounded up to a block size supported by the external memory. For example, if the external memory is double-data-rate (DDR) synchronous dynamic random access memory (SDRAM), the number of memory locations in a compressed buffer block is rounded up to the nearest multiple of DDR burst sizes. In some embodiments of the invention, a compressed buffer block may be the same size as a decompressed buffer block. In some embodiments of the invention, a compressed buffer block may also include memory locations used for buffer management.

Similarly, the uncompressed data buffer (406) may be implemented using any suitable buffer management technique, such as a circular buffer, a sequential list, a linked list, an array, etc. Each entry in the uncompressed data buffer (406) is a block of consecutive memory locations, i.e., an uncompressed buffer block, and is sized to store the number of bits in an uncompressed block of digital image data. More specifically, if the size of an uncompressed block is m×n z-bit pixels, each uncompressed buffer block is sized to store m×n×z bits. That is, an uncompressed buffer block includes a number of memory locations equal to m×n×z divided by the memory location size and rounded up to the next integer. In some embodiments of the invention, the number of memory locations in an uncompressed buffer block is also rounded up to a block size supported by the external memory. For example, if the external memory is double-data-rate (DDR) synchronous dynamic random access memory (SDRAM), the number of memory locations in an uncompressed buffer block is rounded up to the nearest multiple of DDR burst sizes. In some embodiments of the invention, an uncompressed buffer block may also include memory locations used for buffer management.

In one or more embodiments of the invention, the compressed data buffer (404) includes a compressed buffer block for each block in the original digital image data (400). That is, each block in the original digital image data (400) will have a corresponding entry in the compressed data buffer (404), even if the block contents are stored in the uncompressed data buffer (406). As was previously explained, if the number of bits required to compress a block of original digital video data (400) exceeds the threshold number of bits, an uncompressed block marker is stored in the compressed data buffer, and the uncompressed block is stored in the uncompressed data buffer (406). More specifically, the uncompressed block marker is stored in a compressed buffer block, i.e., a dummy compressed buffer block, corresponding to the block of the original digital image data (400) being processed. The uncompressed block marker may be any bit pattern that will not occur in a compressed block. In one or more embodiments of the invention, the first three bytes of the dummy compressed buffer block may be set to a bit pattern of twenty-three zero bits followed by a zero bit (0x000000) or a one bit (0x000001) to indicate that the corresponding block is uncompressed.

In one or more embodiments of the invention, in addition to indicating that the corresponding block is uncompressed, the uncompressed block marker also indicates whether the uncompressed blocks are stored in the uncompressed data buffer in packed mode or in unpacked mode. Packed mode and unpacked mode are explained below. For example, an uncompressed block marker with the value 0x000001 may be used to indicate that the uncompressed blocks are stored in packed mode and an uncompressed block marker with the value 0x000000 may be used to indicate that the uncompressed blocks are stored in unpacked mode. Further, if the uncompressed blocks are stored in packed mode in the uncompressed data buffer (406), a location indicator for the uncompressed block in the uncompressed data buffer is also stored in the dummy compressed buffer block at a location following the uncompressed block marker.

Figure 4B:
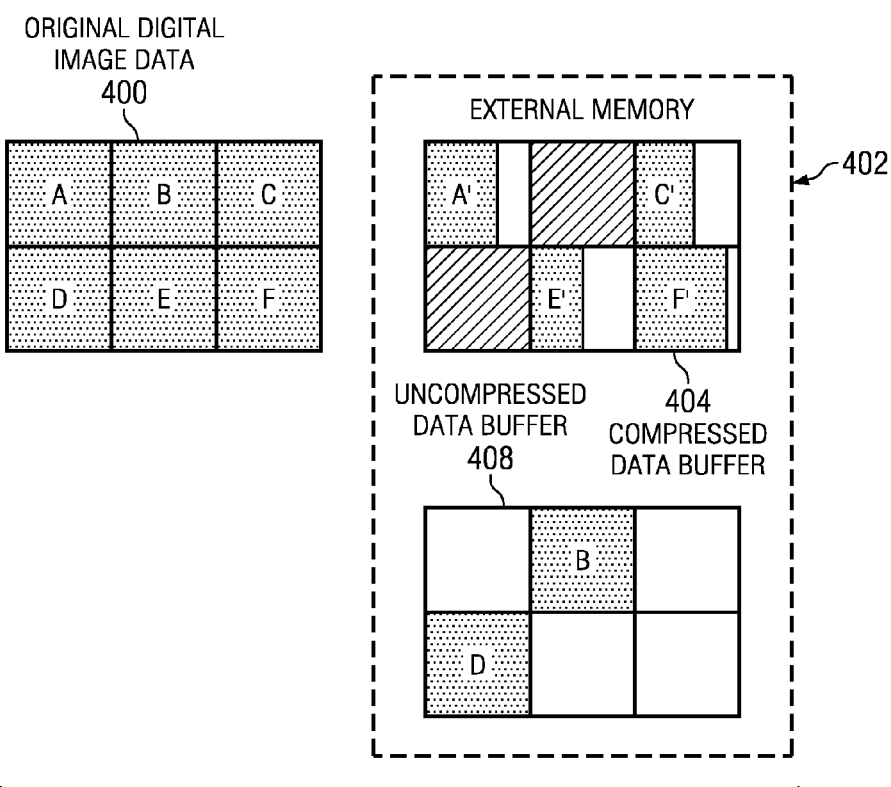

The uncompressed data buffer (406) of FIG. 4A illustrates storage of uncompressed blocks in packed mode and the uncompressed data buffer (408) of FIG. 4B illustrates storage of uncompressed blocks in unpacked mode. In unpacked mode, the uncompressed data buffer (408) includes an uncompressed buffer block for each block in the original digital image data (400). That is, each block in the original digital image data (400) will have a corresponding entry in the uncompressed data buffer (408), even if the block contents are stored in the compressed data buffer (404). In packed mode, the uncompressed blocks are stored in consecutive uncompressed buffer blocks in the uncompressed data buffer (406) and the location of an uncompressed block is determined using the location indicator in the corresponding dummy compressed buffer block. If unpacked mode is used, there will be a lot of unused space in the uncompressed data buffer (408) because most of the blocks in the original digital image data (400) when compressed will not exceed the threshold number of bits. Accordingly, in some embodiments of the invention, the unpacked mode is used only when the size of the compressed buffer blocks is such that there is only sufficient space to store the uncompressed block marker.

The method of FIG. 3 in accordance with one or more embodiments of the invention is illustrated in the simple examples of FIG. 4A and FIG. 4B. FIG. 4A illustrates the method when packed mode is used for storing uncompressed blocks in the uncompressed data buffer and FIG. 4B illustrates the method when unpacked mode is used for storing uncompressed blocks in the uncompressed data buffer. In the example of FIG. 4A, the original digital image data (400) includes six blocks, A, B, C, D, E, and F. Each of these blocks is processed in raster scan order using the method. First, block A is compressed. In this example, the number of bits in the compressed block A is less than the threshold number of bits, so the compressed block, referred to as A', is stored in the first compressed buffer block of the compressed data buffer (404). Recall that compressed buffer blocks are sized to hold the threshold number of bits. Accordingly, if a compressed block has fewer than the threshold number of bits, some of the bits in a compressed buffer block will not be used.

Next, block B of the original digital image data (400) is compressed. In this example, the number of bits in the compressed block B exceeds the threshold number of bits, so the next compressed buffer block in the compressed data buffer (404) is treated as a dummy compressed buffer block. More specifically, an uncompressed data marker (not specifically shown) and a location indicator for the uncompressed block B (not specifically shown) in the uncompressed data buffer (406) are stored in the dummy compressed buffer block. The uncompressed block B is also stored in the first uncompressed block buffer in the uncompressed data buffer (406).

Next, block C is compressed. In this example, the number of bits in the compressed block C is less than the threshold number of bits, so the compressed block, referred to as C', is stored in the next compressed buffer block of the compressed data buffer (404). Then, block D is compressed. In this example, the number of bits in the compressed block D exceeds the threshold number of bits, so the next compressed buffer block in the compressed data buffer (404) is treated as a dummy compressed buffer block. More specifically, an uncompressed data marker (not specifically shown) and a location indicator for the uncompressed block D (not specifically shown) in the uncompressed data buffer (406) are stored in the dummy compressed buffer block. The uncompressed block D is also stored in the next uncompressed block buffer in the uncompressed data buffer (406).

Block E is then compressed. In this example, the number of bits in the compressed block E is less than the threshold number of bits, so the compressed block, referred to as E', is stored in the next compressed buffer block of the compressed data buffer (404). Finally, block F is compressed. In this example, the number of bits in the compressed block F is less than the threshold number of bits, so the compressed block, referred to as F', is stored in the next compressed buffer block of the compressed data buffer (404).

The example of FIG. 4B is similar to that of FIG. 4A, except that when a dummy compressed buffer block is created in the compressed data buffer (404) for block B and D of the original digital image data (400), only an uncompressed buffer marker is stored in the dummy compressed buffer block. Further, the uncompressed blocks B and D are stored in locations in the uncompressed data buffer (408) in uncompressed buffer blocks in the same relative location as in the original digital image data (400) and uncompressed buffer blocks corresponding to the blocks stored in the compressed data buffer (404), i.e., A, C, E, and F, are not used.

Figure 5:
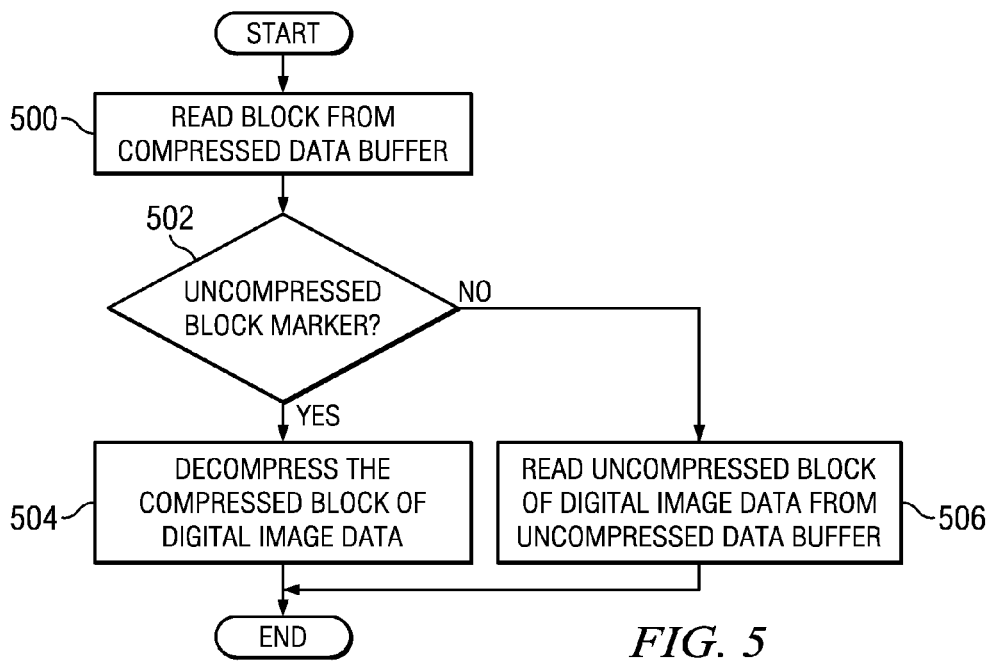
FIGS. 5, 8, 11, and 14 show flow diagrams of methods for digital image data decompression in accordance with one or more embodiments of the invention.

FIG. 5 shows a flow diagram of a method for decompression of digital image data in accordance with one or more embodiments of the invention. The decompression method essentially reverses the compression performed by the compression method of FIG. 3. Initially, a compressed buffer block is read from the compressed data buffer (500). The compressed buffer block is then checked to see an uncompressed block marker is present (502). If there is no uncompressed block marker, the data in the compressed buffer block is decompressed using a decompression technique corresponding to the compression technique used to compress the data (504). Otherwise, the uncompressed block of digital image data is read from the uncompressed data buffer (506). If packed mode was used to store the uncompressed blocks in the uncompressed data buffer, the location indicator in the compressed buffer block is used to determine the address of the decompressed buffer block in the uncompressed data buffer storing the desired uncompressed block. If unpacked mode was used to store the uncompressed blocks, the address of the uncompressed buffer block is computed. For example, the address may be computed by adding the product of the block index in the original digital image data and the uncompressed block size to the starting address of the uncompressed data buffer.

Figure 6:
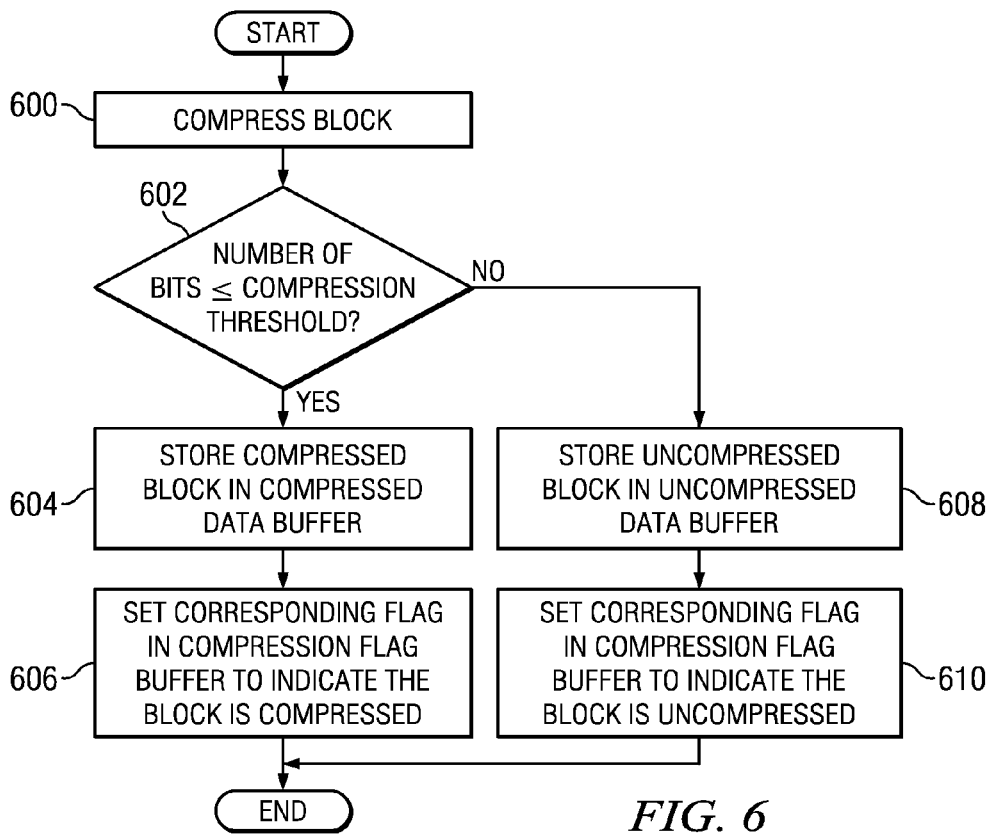

FIG. 6 shows a flow diagram of a method for compression of digital image data in accordance with one or more embodiments of the invention. Similar to the method of FIG. 3, the digital image data to be compressed is evenly divided into blocks. Then, each block is processed using the method of FIG. 6. In one or more embodiments of the invention, the blocks are processed in raster scan order.

As shown in FIG. 6, first the block is compressed using any suitable compression technique (600). For example, the compression technique may be a fixed length coding (FLC) technique, a variable length coding (VLC) technique (lossless or lossy), or a combination thereof. The previously cited co-pending U.S. patent application Ser. No. 12/572,408, provides detailed descriptions of some suitable encoding techniques, which is herein incorporated by reference.

The number of bits in the resulting compressed block is then compared to a compression threshold (602). The compression threshold is determined as described above in reference to FIG. 3. If the number of bits in the compressed block does not exceed the compression threshold, the compressed block is stored in a compressed data buffer (604) in external memory. In addition, a corresponding flag in a compression flag buffer is set to indicate that the block is compressed (606). The compression flag buffer is described in more detail below. Otherwise, the uncompressed block is stored in a separate, uncompressed data buffer (608) in the external memory and the corresponding flag in the compression flag buffer is set to indicate that the block is not compressed (610).

Figure 7A:
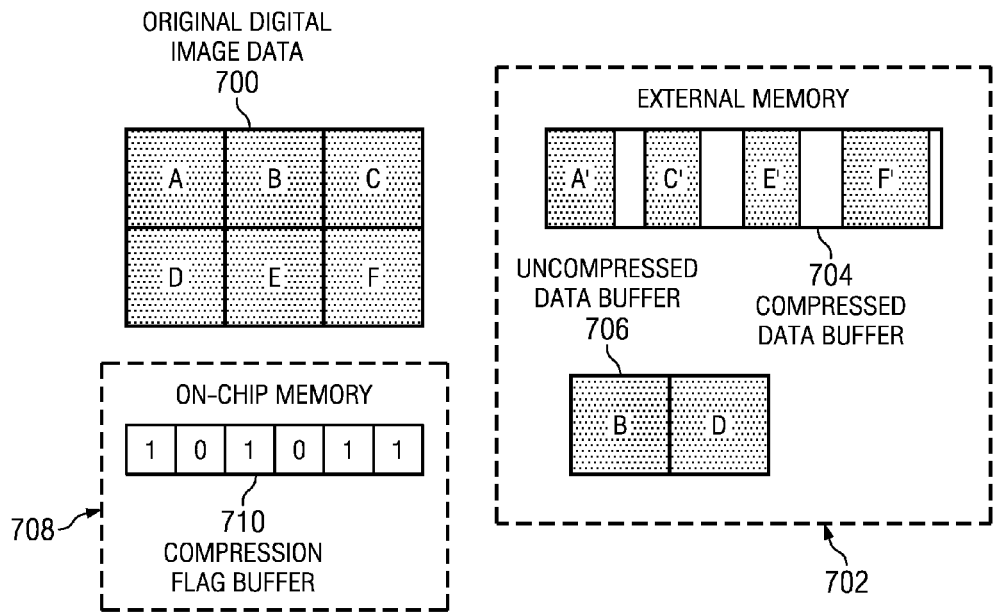

More specifically, as shown in the example of FIG. 7A, in one or more embodiments of the invention, compressed blocks of digital image data are stored in raster scan order in a compressed data buffer (704) in external memory (702), and uncompressed blocks of digital image data are stored a separate, uncompressed data buffer (706) in external memory (702). The compressed data buffer (704) may be implemented using any suitable buffer management technique, such as a circular buffer, a sequential list, a linked list, an array, etc. Each entry in the compressed data buffer (704) is a block of consecutive memory locations, i.e., a compressed buffer block, and is sized to store the compression threshold number of bits. The size of a compressed buffer block in the compressed data buffer (704) may be as was previously described in relation to the compressed data buffer (404) of FIG. 4A.

Similarly, the uncompressed data buffer (706) may be implemented using any suitable buffer management technique, such as a circular buffer, a sequential list, a linked list, an array, etc. Each entry in the uncompressed data buffer (706) is a block of consecutive memory locations, i.e., an uncompressed buffer block, and is sized to store the number of bits in an uncompressed block of digital image data. The size of an uncompressed buffer block in the uncompressed data buffer (706) may be as was previously described in relation to the uncompressed data buffer (406) of FIG. 4A.

The compression flag buffer (710) includes a compression flag location for each block in the original digital image data (700). Each compression flag may be one or more bits in size. Any suitable value may be used for the compression flags to distinguish between compressed and uncompressed blocks. In some embodiments of the invention, the compression flag buffer (710) used one bit per block for the compression flags. In some embodiments, a compression flag value of 1 indicates that the corresponding block in the original digital image data (700) is compressed and stored in the compressed data buffer (704) and a compression flag value of 0 indicates that the corresponding block in the original digital image data (700) is uncompressed and stored in the uncompressed data buffer (706). In other embodiments, the compression flag values are reversed. In one or more embodiments of the invention, the compression flag buffer (710) is stored in on-chip memory (708). In some embodiments of the invention, the compression flag buffer may be stored in external memory.

Figure 7B:
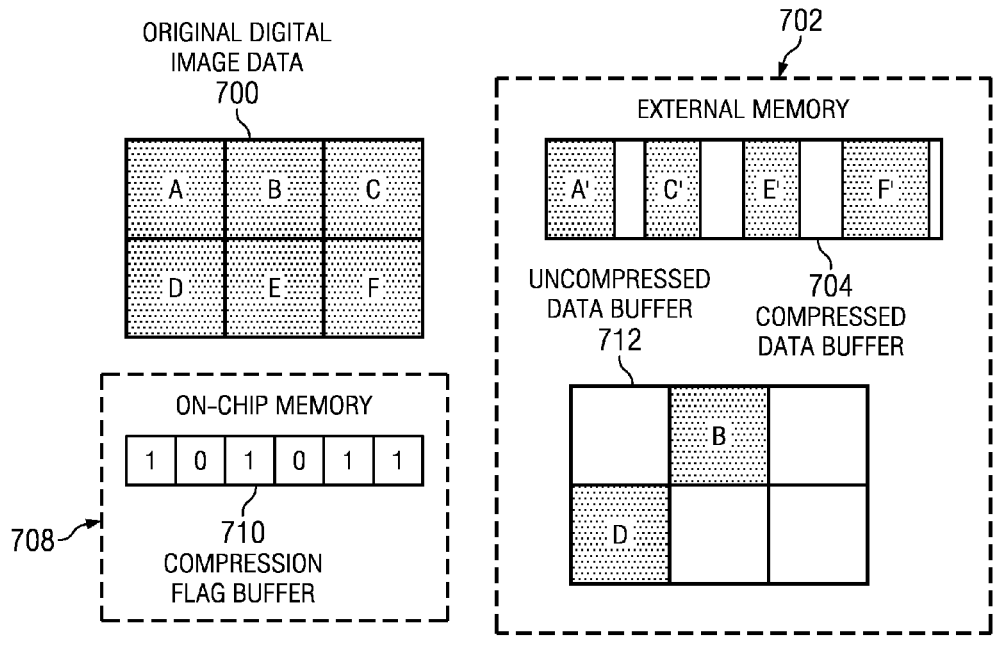

The uncompressed blocks may be stored in the uncompressed data buffer in either packed mode or unpacked mode. The uncompressed data buffer (706) of FIG. 7A illustrates storage of uncompressed blocks in packed mode and the uncompressed data buffer (712) of FIG. 7B illustrates storage of uncompressed blocks in unpacked mode. In unpacked mode, the uncompressed data buffer (712) includes an uncompressed buffer block for each block in the original digital image data (700). That is, each block in the original digital image data (700) will have a corresponding entry in the uncompressed data buffer (712), even if the block contents are stored in the compressed data buffer (704). In packed mode, the uncompressed blocks are stored in consecutive uncompressed buffer blocks in the uncompressed data buffer (706).

The method of FIG. 6 in accordance with one or more embodiments of the invention is illustrated in the simple examples of FIG. 7A and FIG. 7B. FIG. 7A illustrates the method when packed mode is used for storing uncompressed blocks in the uncompressed data buffer and FIG. 7B illustrates the method when unpacked mode is used for storing uncompressed blocks in the uncompressed data buffer. In the example of FIG. 7A, the original digital image data (700) includes six blocks, A, B, C, D, E, and F. Each of these blocks is processed in raster scan order using the method. First, block A is compressed. In this example, the number of bits in the compressed block A is less than the threshold number of bits, so the compressed block, referred to as A', is stored in the first compressed buffer block of the compressed data buffer (704). In addition, the compression flag in the compression flag buffer (710) corresponding to block A is set to 1 to indicate that the block is compressed and stored in the compressed data buffer (704).

Next, block B of the original digital image data (700) is compressed. In this example, the number of bits in the compressed block B exceeds the threshold number of bits, so the uncompressed block is stored in the first uncompressed buffer block of the uncompressed data buffer (706). In addition, the compression flag in the compression flag buffer (710) corresponding to block B is set to 0 to indicate that the block is not compressed and is stored in the uncompressed data buffer (706).

Next, block C is compressed. In this example, the number of bits in the compressed block C is less than the threshold number of bits, so the compressed block, referred to as C', is stored in the next compressed buffer block of the compressed data buffer (704). In addition, the compression flag in the compression flag buffer (710) corresponding to block C is set to 1 to indicate that the block is compressed and stored in the compressed data buffer (704).

Then, block D is compressed. In this example, the number of bits in the compressed block D exceeds the threshold number of bits, so the uncompressed block is stored in the next uncompressed buffer block of the uncompressed data buffer (706). In addition, the compression flag in the compression flag buffer (710) corresponding to block D is set to 0 to indicate that the block is not compressed and is stored in the uncompressed data buffer (706).

Block E is then compressed. In this example, the number of bits in the compressed block E is less than the threshold number of bits, so the compressed block, referred to as E', is stored in the next compressed buffer block of the compressed data buffer (404). In addition, the compression flag in the compression flag buffer (710) corresponding to block E is set to 1 to indicate that the block is compressed and stored in the compressed data buffer (704). Finally, block F is compressed. In this example, the number of bits in the compressed block F is less than the threshold number of bits, so the compressed block, referred to as F', is stored in the next compressed buffer block of the compressed data buffer (404). In addition, the compression flag in the compression flag buffer (710) corresponding to block F is set to 1 to indicate that the block is compressed and stored in the compressed data buffer (704).

The example of FIG. 7B is similar to that of FIG. 7A, except that the uncompressed blocks B and D are stored in locations in the uncompressed data buffer (712) in uncompressed buffer blocks in the same relative location as in the original digital image data (700) and uncompressed buffer blocks corresponding to the blocks stored in the compressed data buffer (704), i.e., A, C, E, and F, are not used.

Figure 8:
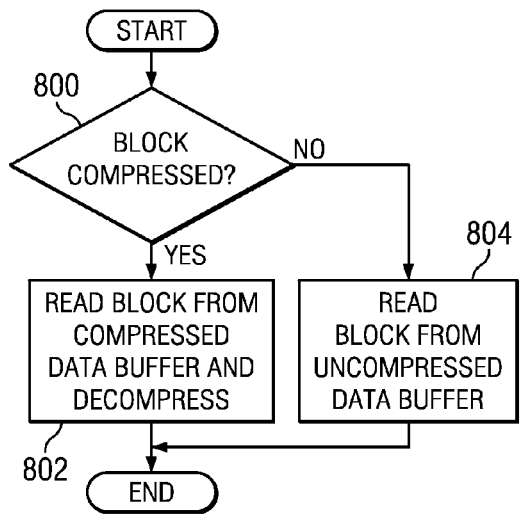

FIG. 8 shows a flow diagram of a method for decompression of digital image data in accordance with one or more embodiments of the invention. The decompression method essentially reverses the compression performed by the compression method of FIG. 6. Initially, a compression flag corresponding to a block is read from the compression flag buffer and checked to determine whether the block is compressed or uncompressed (800). If the compression flag indicates that the block is compressed, the corresponding compressed buffer block is read from the compressed data buffer and decompressed using a decompression technique corresponding to the compression technique used to compress the data (802). Otherwise, the corresponding uncompressed buffer block is read from the uncompressed data buffer (804).

In one or more embodiments of the invention, the compression flag is multiple bits in size and also indicates the amount of compression achieved. As previously explained, in some embodiments of the invention, a compression threshold T is computed as $T=(M \times N \times nrbits)/f$ where M is the width of a block, N is the height of a block, nrbits is the number of bits in a pixel, and f is a compression factor. In some embodiments of the invention, more than one compression threshold is used where each additional compression threshold is a factor of T. In such embodiments, the compression flag indicates which of the multiple compression thresholds is closest to the size of a compressed block. For example, if a two-bit compression flag is used, there are four possible compression flag values, 00, 01, 10, and 11 and three possible thresholds. Further, in embodiments that use multiple threshold values, when a block is compressed, the number of bits in the compressed block is compared with the multiple threshold values and the corresponding compression flag is set according to the appropriate threshold. As is described in more detail below, the compression flag values are used during decompression as indicators of the amount of data to be read from external memory.

FIGS. 9A and 9B, FIG. 11, FIG. 12, and FIG. 14 show flow diagrams of methods for compression and decompression of digital image data using multiple compression thresholds and multi-bit, i.e., n-bit, compression flags in accordance with one or more embodiments of the invention. For simplicity of explanation, a two-bit compression flag and three compression thresholds, $T_1 > T_2 > T_3$, are assumed. In one or more embodiments, the largest compression threshold $T_1$ may be determined as previously described in reference to FIG. 3 and the other compression thresholds set as factors of $T_1$, e.g., $T_2 = T_1/2$ and $T_3 = T_1/4$. The four possible compression flag values are 00, 01, 10, and 11, where 00 indicates an uncompressed block, 01 indicates a compressed block of a size that does not exceed $T_1$, 10 indicates a compressed block of a size that does not exceed $T_2$, and 11 indicates a compressed block of a size that does not exceed $T_3$. One of ordinary skill in the art will understand other embodiments using more bits for the compressions flags and corresponding numbers of compression thresholds.

Figure 9A:
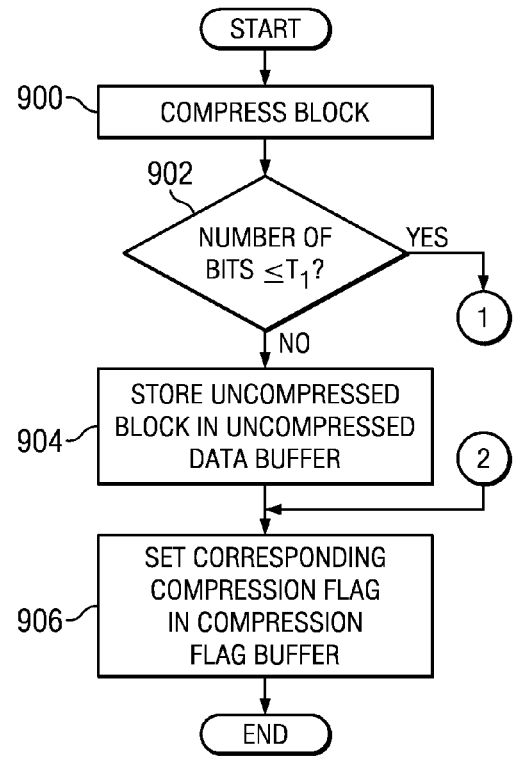
Figure 9B:
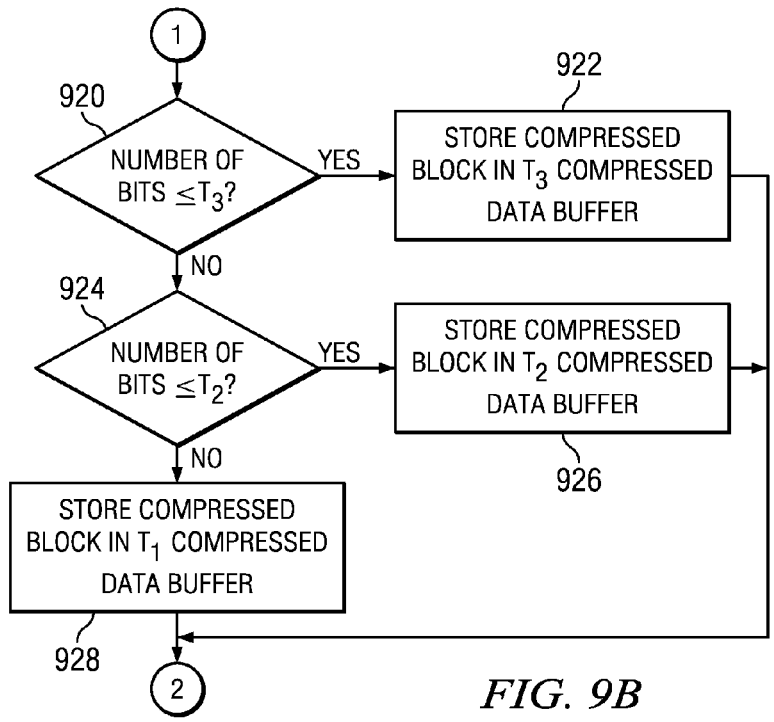

FIGS. 9A and 9B show a flow diagram of a method for compression of digital image data using multiple compression thresholds and multi-bit compression flags in accordance with one or more embodiments of the invention. Similar to the method of FIG. 3, the digital image data to be compressed is evenly divided into blocks. Then, each block is processed using the method of FIGS. 9A and 9B. In one or more embodiments of the invention, the blocks are processed in raster scan order. First, the block is compressed using any suitable compression technique (900). For example, the compression technique may be a fixed length coding (FLC) technique, a variable length coding (VLC) technique (lossless or lossy), or a combination thereof. The previously cited co-pending U.S. patent application Ser. No. 12/572,408 provides detailed descriptions of some suitable encoding techniques.

The number of bits in the resulting compressed block is then compared to the largest compression threshold $T_1$ (902). If the number of bits in the compressed block exceeds the largest compression threshold $T_1$, the uncompressed block is stored in an uncompressed data buffer (904) in external memory. Otherwise, the compressed block is stored in one of three separate, compressed data buffers in the external memory. Referring to FIG. 9A, the number of bits in the compressed block is compared to the smallest compression threshold $T_3$ (920). If the number of bits in the compressed block does not exceed the smallest compression threshold $T_3$, the compressed block is stored in an compressed data buffer in external memory used for storing only compressed blocks whose number of bits do not exceed $T_3$ (922). Otherwise, the number of bits in the compressed block is compared to the next smallest compression threshold $T_2$ (924). If the number of bits in the compressed block does not exceed the next smallest compression threshold $T_2$, the compressed block is stored in an compressed data buffer in external memory used for storing only compressed blocks whose number of bits do not exceed $T_2$ (922). Otherwise, the compressed block is stored in an compressed data buffer in external memory used for storing only compressed blocks whose number of bits do not exceed the largest threshold $T_1$ (922).

Figure 10:
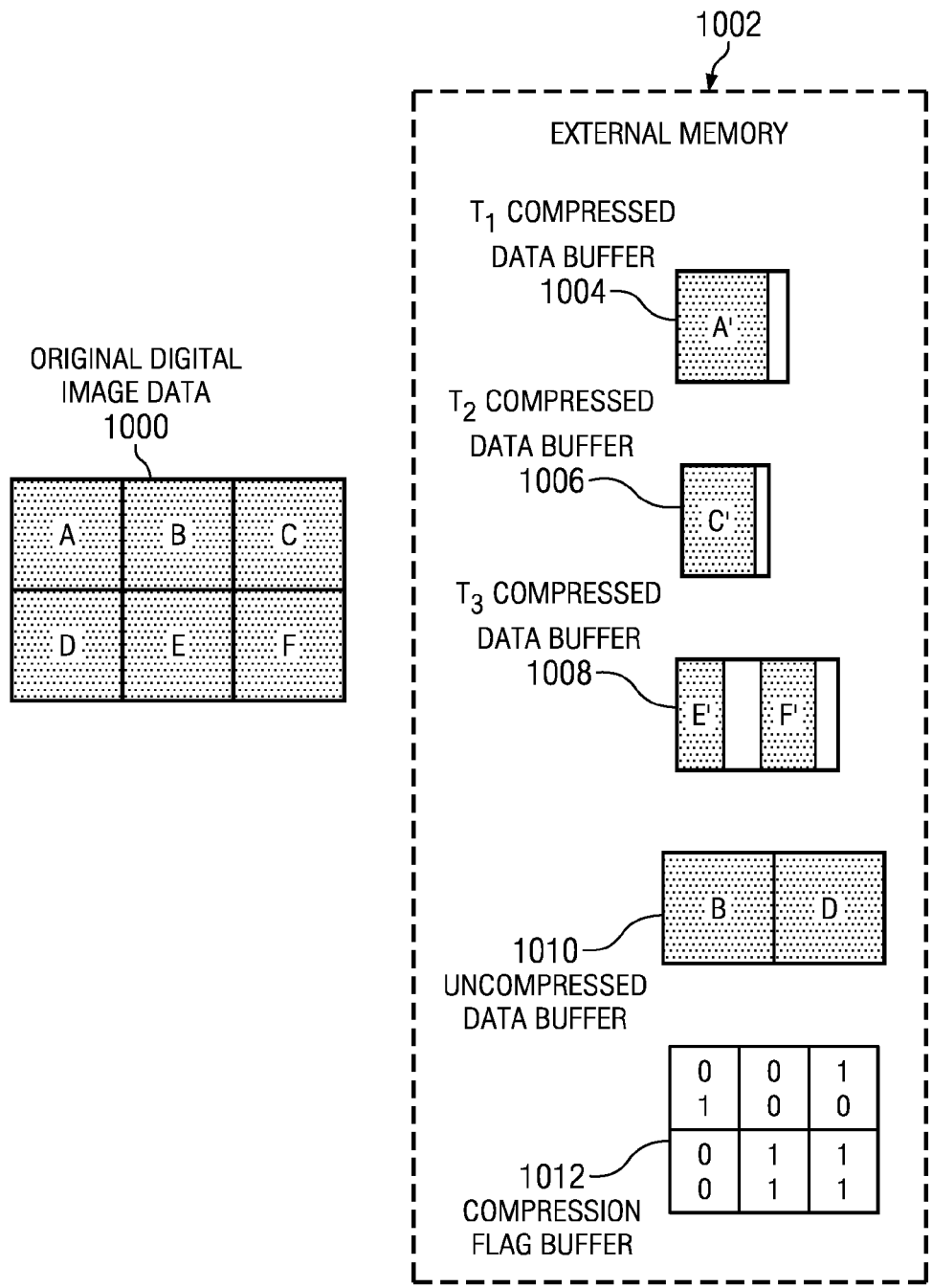

More specifically, as shown in the example of FIG. 10, in one or more embodiments of the invention, compressed blocks of digital image data are stored in compressed data buffers (1004, 1006, 1008) in external memory (1002), and uncompressed blocks of digital image data are stored a separate, uncompressed data buffer (1010) in external memory (1002). The compressed data buffers (1004, 1006, 1008) may be implemented using any suitable buffer management technique, such as a circular buffer, a sequential list, a linked list, an array, etc. Each entry in the compressed data buffers (1004, 1006, 1008) is a block of consecutive memory locations, i.e., a compressed buffer block, and is sized to store the number of bits of corresponding compression threshold, i.e., $T_1$, $T_2$, and $T_3$. The size of a compressed buffer block in each of the compressed data buffer (1004, 1006, 1008) may be selected based on the corresponding compression threshold as was previously described in relation to the compressed data buffer (404) of FIG. 4A.

Similarly, the uncompressed data buffer (1010) may be implemented using any suitable buffer management technique, such as a circular buffer, a sequential list, a linked list, an array, etc. Each entry in the uncompressed data buffer (1010) is a block of consecutive memory locations, i.e., an uncompressed buffer block, and is sized to store the number of bits in an uncompressed block of digital image data. The size of an uncompressed buffer block in the uncompressed data buffer (1010) may be as was previously described in relation to the uncompressed data buffer (406) of FIG. 4A.

Referring back to FIG. 9A, after the uncompressed or compressed block is stored in external memory, a compression flag corresponding to the block in a compression flag buffer is set (906). Referring again to the example of FIG. 10, the compression flag buffer (1012) includes a compression flag location for each block in the original digital image data (1000). In one or more embodiments of the invention, the compression flag buffer (1012) is stored in external memory (1002). In other embodiments of the invention, the compression flag buffer is stored in on-chip memory.

If the uncompressed block was stored in the uncompressed data buffer (1010), the compression flag is set to 00. If the compressed block was stored, the compression flag is set to indicate in which of the three compressed data buffers the compressed block was stored. Referring again to the example of FIG. 10, if the compressed block was stored in the $T_1$ compressed data buffer (1004), the compression flag is set to 01 in the compression flag buffer (1012). If the compressed block was stored in the $T_2$ compressed data buffer (1006), the compression flag is set to 10 in the compression flag buffer (1012). If the compressed block was stored in the $T_3$ compressed data buffer (1008), the compression flag is set to 11 in the compression flag buffer (1012).

The method of FIGS. 9A and 9B in accordance with one or more embodiments of the invention is illustrated in the simple example of FIG. 10. In the example, the original digital image data (1000) includes six blocks, A, B, C, D, E, and F. Each of these blocks is processed in raster scan order using the method. First, block A is compressed. In this example, the number of bits in the compressed block A is less than the largest compression threshold $T_1$, so the compressed block, referred to as A', is stored in the first compressed buffer block of the $T_1$ compressed data buffer (1004). In addition, the compression flag in the compression flag buffer (1012) corresponding to block A is set to 01 to indicate that the block is compressed and stored in the $T_1$ compressed data buffer (1004).

Next, block B of the original digital image data (1000) is compressed. In this example, the number of bits in the compressed block B exceeds the largest compression threshold $T_1$, so the uncompressed block is stored in the first uncompressed buffer block of the uncompressed data buffer (1010). In addition, the compression flag in the compression flag buffer (1012) corresponding to block B is set to 00 to indicate that the block is not compressed and is stored in the uncompressed data buffer (1010).

Next, block C is compressed. In this example, the number of bits in the compressed block C is less than the second largest compression $T_2$, so the compressed block, referred to as C', is stored in the first compressed buffer block of the $T_2$ compressed data buffer (1006). In addition, the compression flag in the compression flag buffer (1012) corresponding to block C is set to 10 to indicate that the block is compressed and stored in the $T_2$ compressed data buffer (1006).

Then, block D is compressed. In this example, the number of bits in the compressed block D exceeds the largest compression threshold $T_1$, so the uncompressed block is stored in the next uncompressed buffer block of the uncompressed data buffer (1010). In addition, the compression flag in the compression flag buffer (1012) corresponding to block D is set to 00 to indicate that the block is not compressed and is stored in the uncompressed data buffer (1010).

Block E is then compressed. In this example, the number of bits in the compressed block E is less than the smallest compression threshold $T_3$, so the compressed block, referred to as E', is stored in the first compressed buffer block of the $T_3$ compressed data buffer (1008). In addition, the compression flag in the compression flag buffer (1012) corresponding to block E is set to 11 to indicate that the block is compressed and stored in the $T_3$ compressed data buffer (704). Finally, block F is compressed. In this example, the number of bits in the compressed block F is less than the smallest compression threshold $T_3$, so the compressed block, referred to as F', is stored in the next compressed buffer block of the $T_3$ compressed data buffer (1008). In addition, the compression flag in the compression flag buffer (1012) corresponding to block F is set to 11 to indicate that the block is compressed and stored in the $T_3$ compressed data buffer (1008).

Figure 11:
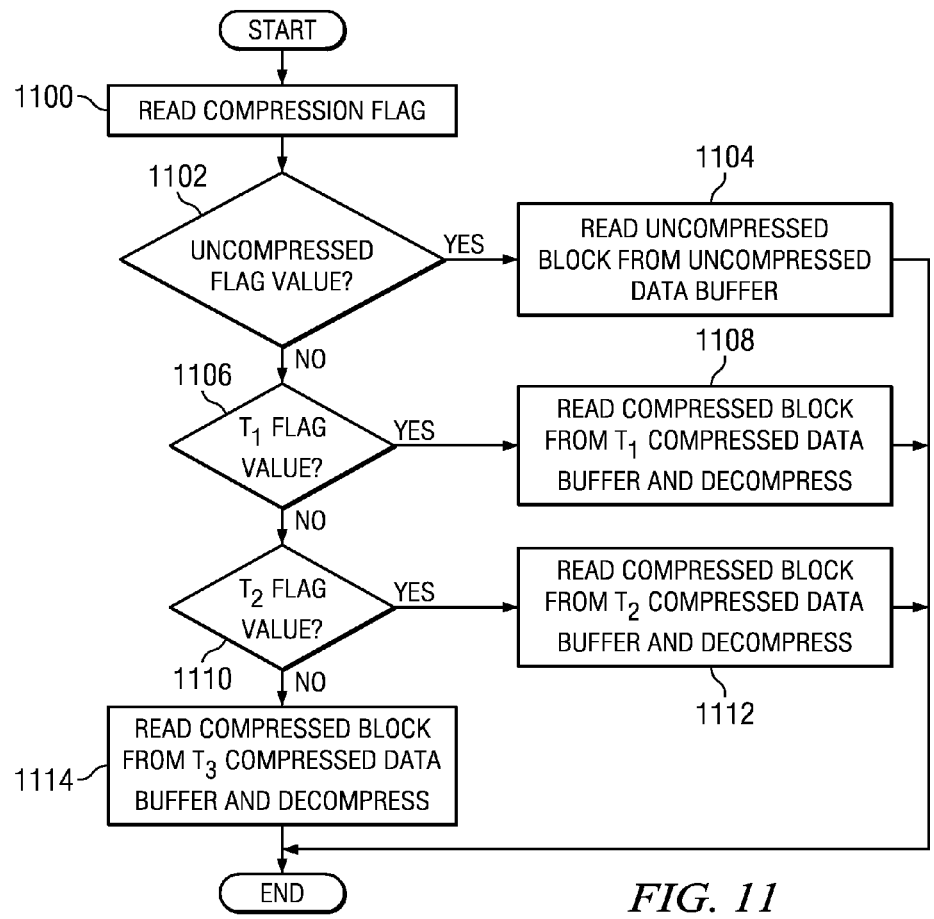

FIG. 11 shows a flow diagram of a method for decompression of digital image data in accordance with one or more embodiments of the invention. The decompression method essentially reverses the compression performed by the compression method of FIGS. 9A and 9B. Initially, a compression flag corresponding to a block is read from the compression flag buffer (1100). If the compression flag value is the uncompressed flag value 00 (1102), the corresponding uncompressed buffer block is read from the uncompressed data buffer (1104). Otherwise, if the compression flag value is the $T_1$ flag value 01 (1106), the corresponding compressed buffer block is read from the $T_1$ compressed data buffer and decompressed (1108). Otherwise, if the compression flag value is the $T_2$ flag value 10 (1110), the corresponding compressed buffer block is read from the $T_2$ compressed data buffer and decompressed (1112). Otherwise, the corresponding compressed buffer block is read from the $T_3$ compressed data buffer and decompressed (1114).

Figure 12:
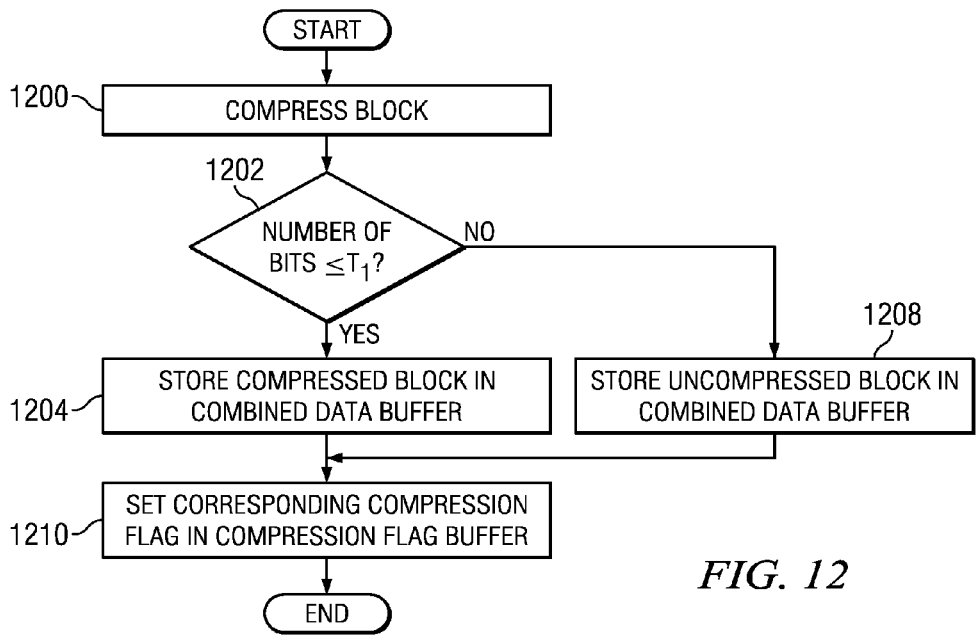

FIG. 12 shows a flow diagram of a method for compression of digital image data using multiple compression thresholds and multi-bit compression flags in accordance with one or more embodiments of the invention. Similar to the method of FIG. 3, the digital image data to be compressed is evenly divided into blocks. Then, each block is processed using the method of FIG. 12. In one or more embodiments of the invention, the blocks are processed in raster scan order. First, the block is compressed using any suitable compression technique (1200). For example, the compression technique may be a fixed length coding (FLC) technique, a variable length coding (VLC) technique (lossless or lossy), or a combination thereof. The previously cited co-pending U.S. patent application Ser. No. 12/572,408 provides detailed descriptions of some suitable encoding techniques.

The number of bits in the resulting compressed block is then compared to the largest compression threshold $T_1$ (1202). If the number of bits in the compressed block exceeds the largest compression threshold $T_1$, the uncompressed block is stored in a combined data buffer (1208) in external memory. Otherwise, the compressed block is stored in the combined data buffer (1204).

Figure 13:
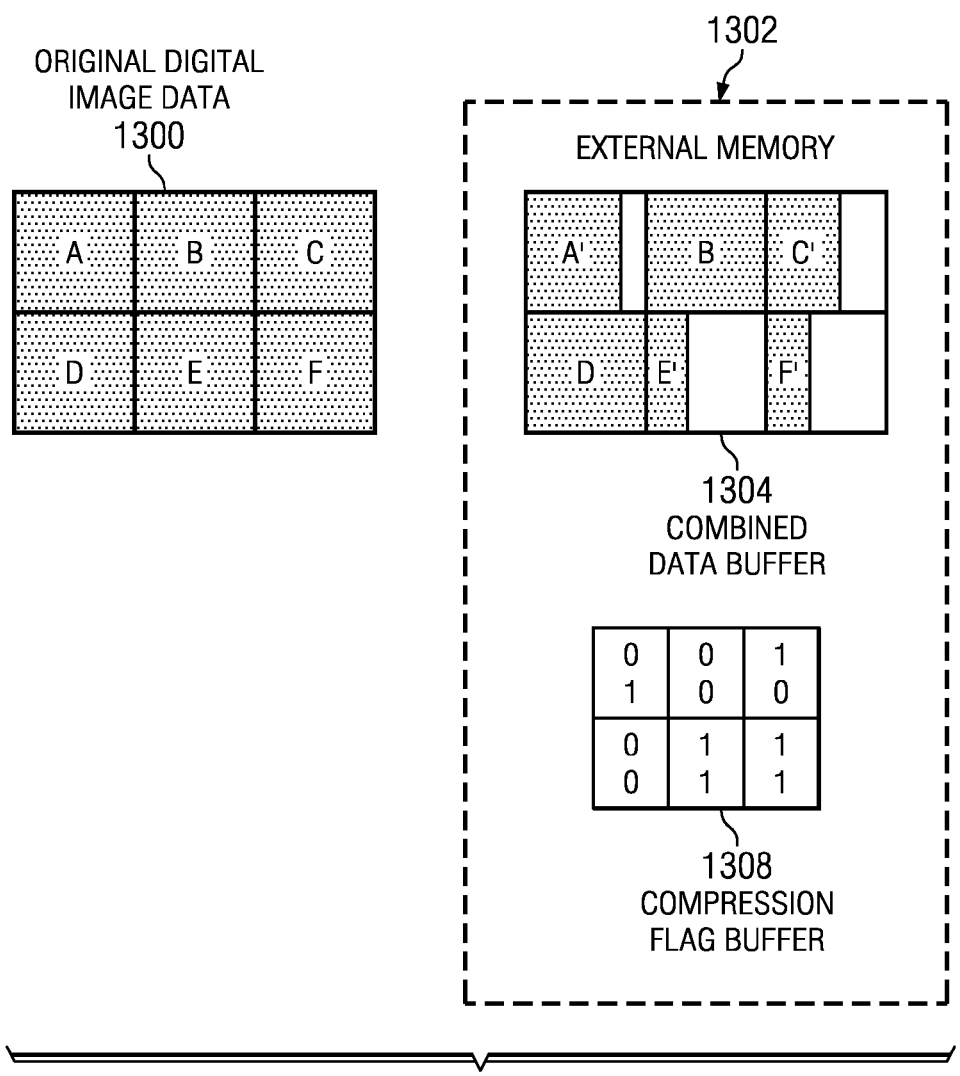

More specifically, as shown in the example of FIG. 13, in one or more embodiments of the invention, both compressed blocks of digital image data and uncompressed blocks of digital image data are stored in raster scan order in a combined data buffer (1304) in external memory (1302). That is, the combined data buffer (1304) will have an entry corresponding to each block in the original digital image data (1300). The combined data buffer (1304) may be implemented using any suitable buffer management technique, such as a circular buffer, a sequential list, a linked list, an array, etc. Each entry in the combined data buffer (1304) is a block of consecutive memory locations, i.e., an uncompressed buffer block, and is sized to store the number of bits in an uncompressed block of digital image data. The size of an uncompressed buffer block in the combined data buffer (1304) may be as was previously described in relation to the uncompressed data buffer (406) of FIG. 4A.

Referring back to FIG. 12, after the uncompressed or compressed block is stored in the combined data buffer, a compression flag corresponding to the block in a compression flag buffer is set (1210). Referring again to the example of FIG. 13, the compression flag buffer (1308) includes a compression flag location for each block in the original digital image data (1300). In one or more embodiments of the invention, the compression flag buffer (1308) is stored in external memory (1302).

If the uncompressed block was stored in the combined data buffer (1304), the compression flag is set to 00. Otherwise, if the number of bits in the compressed block does not exceed the smallest compression threshold $T_3$, the compression flag is set to 11 in the compression flag buffer (1308). Otherwise, if the number of bits in the compressed block does not exceed the next largest compression threshold $T_2$, the compression flag is set to 10 in the compression flag buffer (1308). Otherwise, the compression flag is set to 01 in the compression flag buffer (1308).

The method of FIG. 12 in accordance with one or more embodiments of the invention is illustrated in the simple example of FIG. 13. In the example, the original digital image data (1300) includes six blocks, A, B, C, D, E, and F. Each of these blocks is processed in raster scan order using the method. First, block A is compressed. In this example, the number of bits in the compressed block A does not exceed the largest compression threshold $T_1$, so the compressed block is stored in the first uncompressed buffer block of the combined data buffer (1304). Further, in this example, the number of bits in the compressed block A exceeds both compression thresholds $T_3$ and $T_2$ but does not exceed the largest compression threshold $T_1$, so the compression flag in the compression flag buffer (1308) corresponding to block A is set to 01.

Next, block B of the original digital image data (1300) is compressed. In this example, the number of bits in the compressed block B exceeds the largest compression threshold $T_1$, so the uncompressed block is stored in the next uncompressed buffer block of the combined data buffer (1304). In addition, the compression flag in the compression flag buffer (1308) corresponding to block B is set to 00 to indicate that the block is not compressed.

Next, block C is compressed. In this example, the number of bits in the compressed block C does not exceed the largest compression threshold $T_1$, so the compressed block is stored in the next uncompressed buffer block of the combined data buffer (1304). Further, in this example, the number of bits in the compressed block C exceeds compression threshold $T_3$ but does not exceed the compression threshold $T_2$, so the compression flag in the compression flag buffer (1308) corresponding to block C is set to 10.

Then, block D is compressed. In this example, the number of bits in the compressed block D exceeds the largest compression threshold $T_1$, so the uncompressed block is stored in the next uncompressed buffer block of the combined data buffer (1304). In addition, the compression flag in the compression flag buffer (1308) corresponding to block D is set to 00 to indicate that the block is not compressed.

Block E is then compressed. In this example, the number of bits in the compressed block E does not exceed the largest compression threshold $T_1$, so the compressed block is stored in the next uncompressed buffer block of the combined data buffer (1304). Further, in this example, the number of bits in the compressed block E does not exceed the smallest compression threshold $T_3$, so the compression flag in the compression flag buffer (1308) corresponding to block E is set to 11. Finally, block F is compressed. In this example, the number of bits in the compressed block F does not exceed the largest compression threshold $T_1$, so the compressed block is stored in the next uncompressed buffer block of the combined data buffer (1304). Further, in this example, the number of bits in the compressed block F does not exceed the smallest compression threshold $T_3$, so the compression flag in the compression flag buffer (1308) corresponding to block F is set to 11.

Figure 14:
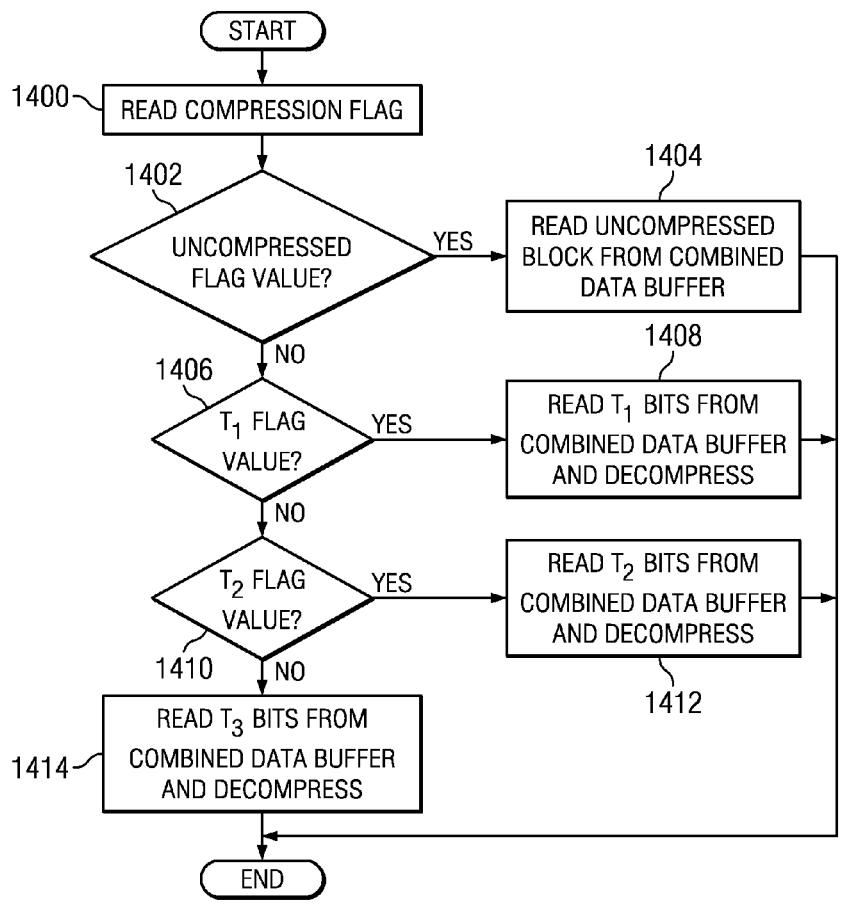

FIG. 14 shows a flow diagram of a method for decompression of digital image data in accordance with one or more embodiments of the invention. The decompression method essentially reverses the compression performed by the compression method of FIG. 12. Initially, a compression flag corresponding to a block is read from the compression flag buffer (1400). If the compression flag value is the uncompressed flag value 00 (1402), the corresponding uncompressed buffer block is read from the combined data buffer (1404). Otherwise, if the compression flag value is the $T_1$ flag value 01 (1406), $T_1$ bits (which may be rounded up as previously described for determining the size of a compressed buffer block) in the corresponding uncompressed buffer block are read from the combined data buffer and decompressed (1408). Otherwise, if the compression flag value is the $T_2$ flag value 10 (1410), $T_2$ bits (which may be rounded up as previously described for determining the size of a compressed buffer block) in the corresponding uncompressed buffer block are read from the combined data buffer and decompressed (1412). Otherwise, $T_3$ bits (which may be rounded up as previously described for determining the size of a compressed buffer block) in the corresponding uncompressed buffer block are read from the combined data buffer and decompressed (1414). The address of an uncompressed buffer block in the combined buffer block may be computed by adding the product of the block index in the original digital image data and the uncompressed block size to the starting address of the combined data buffer.

In embodiments that use multiple threshold values, during decompression, memory bandwidth requirements are reduced over the single threshold embodiments as the compression flag indicates how much data should be read from the compressed data buffer. For example, if the compression flag indicates that a block is compressed to less than or equal to T/4 bits, then only the consecutive memory locations in the corresponding compressed buffer block in the compressed data buffer that store T/4 bits need to be read rather than the entire larger compressed buffer block as required by single threshold embodiments.

One of ordinary skill in the art will understand embodiments of the compression and decompression methods as described in reference to FIG. 12-14 in which the compression flag is a single bit and only one compression threshold is used. In such embodiments, the compressed and uncompressed blocks are stored in a combined data buffer as described in the compression method of FIG. 12 where the one bit compression flag is set to indicate whether the block is compressed or uncompressed. Further, in such embodiments, the compressed and uncompressed blocks are read from the combined data buffer and processed in a similar fashion that described in the decompression method of FIG. 14. Of course, there will be no need to check for more than one level of compression. For example, if the compression flag has the uncompressed flag value, the uncompressed block is read from the combined data buffer. Otherwise, the compression flag will have the compressed flag value, and the threshold number bits (which may be rounded up as previously described for determining the size of a compressed buffer block) is read from the combined data buffer and decompressed.

The memory bandwidth reduction for reading data from external memory achieved by embodiments of the invention according to FIGS. 3 and 5 can be expressed as a compression ratio $1/(P+1/f)$ where P is the percentage of the blocks of original digital image data that could not be compressed to less than the threshold number of bits and are thus stored as uncompressed blocks and f is the compression factor. For example, if f=2 and P=10%, the overall compression ratio is 1.67. The memory bandwidth reduction for writing data to the external memory is also at least $1/(P+1/f)$. The write memory bandwidth reduction may be more than $1/(P+1/f)$ because the writes to the external memory may be rounded up to multiples of a fixed-sized burst used for accessing the external memory.

Further, in embodiments of the invention according to FIGS. 6 and 8 that use a single bit compressed flag, the read bandwidth is reduced by $1/(P+(1-P)/f)$ (without considering the overhead of one-bit per block compression flag), and the write bandwidth is reduced by at least that much. For embodiments of the invention that use an n-bit compression flag, the compression ratio is given by $$\frac{M * N * nrbits}{n + P_0 * M * N * nrbits + \sum_{k=1}^{n} P_k * T_k},$$

where M*N is the block size, nrbits is the pixel bit precision, n is the number of bits used for a compression flag, $T_k$ (k=1, 2, ... $2^n$−1) are compression thresholds, $P_0$ is the percentage of uncompressed blocks, and $P_k$ (k=1, 2, ... $2^n$−1) is the percentage of blocks that can be compressed with more than $T_{k+1}$ bits but less than or equal to $T_k$ bits.

Embodiments of the encoders and methods described herein may be provided on any of several types of digital systems: digital signal processors (DSPs), general purpose programmable processors, application specific circuits, or systems on a chip (SoC) such as combinations of a DSP and a reduced instruction set (RISC) processor together with various specialized programmable accelerators. A stored program in an onboard or external (flash EEP) ROM or FRAM may be used to implement the video signal processing. Analog-to-digital converters and digital-to-analog converters provide coupling to the real world, modulators and demodulators (plus antennas for air interfaces) can provide coupling for transmission waveforms, and packetizers can provide formats for transmission over networks such as the Internet.

The techniques described in this disclosure may be implemented in hardware, software, firmware, or any combination thereof. If implemented in software, the software may be executed in one or more processors, such as a microprocessor, application specific integrated circuit (ASIC), field programmable gate array (FPGA), or digital signal processor (DSP). The software that executes the techniques may be initially stored in a computer-readable medium such as compact disc (CD), a diskette, a tape, a file, memory, or any other computer readable storage device and loaded and executed in the processor. In some cases, the software may also be sold in a computer program product, which includes the computer-readable medium and packaging materials for the computer-readable medium. In some cases, the software instructions may be distributed via removable computer readable media (e.g., floppy disk, optical disk, flash memory, USB key), via a transmission path from computer readable media on another digital system, etc.

Figure 17:
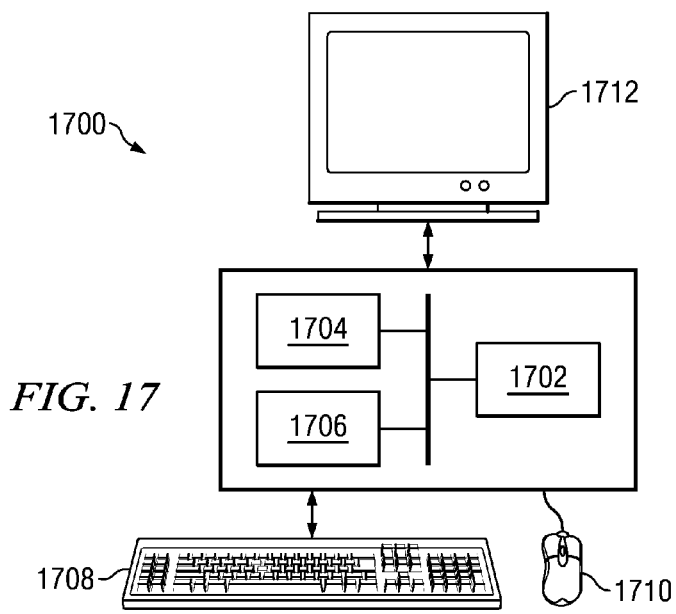
FIGS. 15-17 show illustrative digital systems in accordance with one or more embodiments of the invention.
Figure 15:
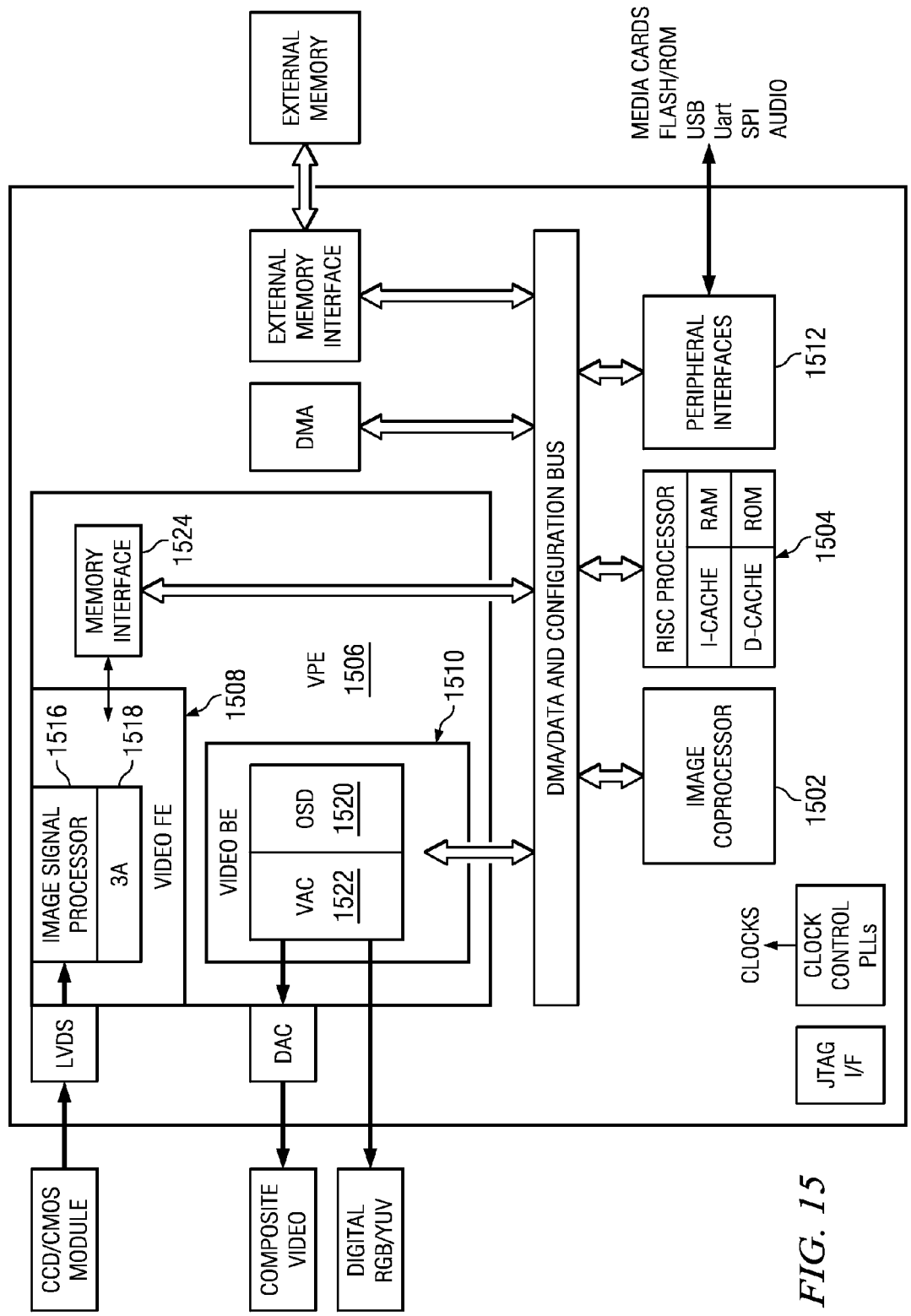
Figure 16:
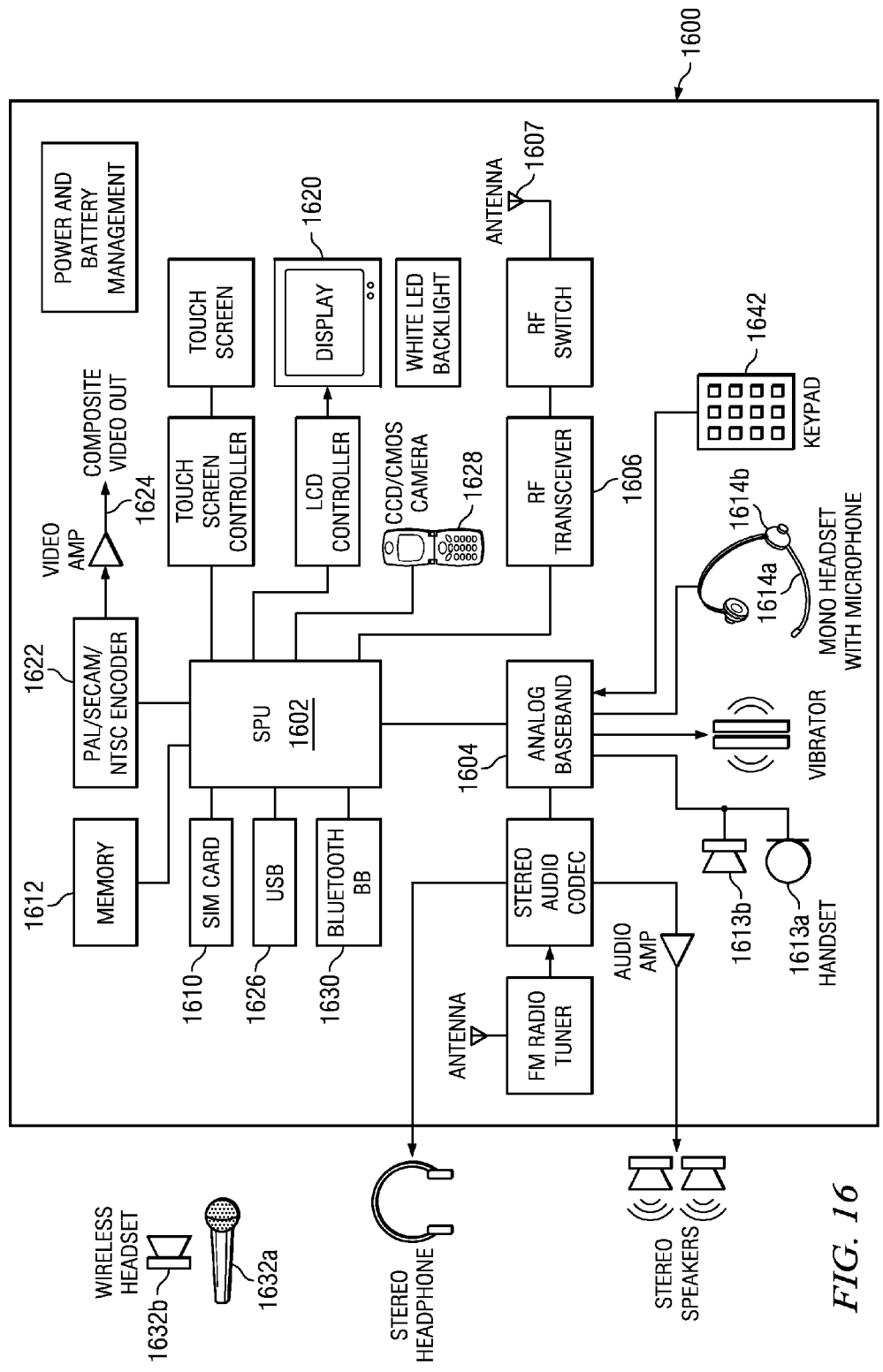

Embodiments of the methods for digital image data compression and decompression as described herein may be implemented for virtually any type of digital system (e.g., a desk top computer, a laptop computer, a handheld device such as a mobile (i.e., cellular) phone, a personal digital assistant, a digital camera, etc.) with functionality to capture or otherwise generate digital image data. FIGS. 15-17 show block diagrams of illustrative digital systems.

FIG. 15 shows a digital system suitable for an embedded system (e.g., a digital camera) in accordance with one or more embodiments of the invention that includes, among other components, a DSP-based image coprocessor (ICP) (1502), a RISC processor (1504), and a video processing engine (VPE) (1506) that may be configured to perform methods for digital image data compression and decompression described herein. The RISC processor (1504) may be any suitably configured RISC processor. The VPE (1506) includes a configurable video processing front-end (Video FE) (1508) input interface used for video capture from imaging peripherals such as image sensors, video decoders, etc., a configurable video processing back-end (Video BE) (1510) output interface used for display devices such as SDTV displays, digital LCD panels, HDTV video encoders, etc, and memory interface (1524) shared by the Video FE (1508) and the Video BE (1510). The digital system also includes peripheral interfaces (1512) for various peripherals that may include a multi-media card, an audio serial port, a Universal Serial Bus (USB) controller, a serial port interface, etc.

The Video FE (1508) includes an image signal processor (ISP) (1516), and a 3A statistic generator (3A) (1518). The ISP (1516) provides an interface to image sensors and digital video sources. More specifically, the ISP (1516) may accept raw image/video data from a sensor (CMOS or CCD) and can accept YUV video data in numerous formats. The ISP (1516) also includes a parameterized image processing module with functionality to generate image data in a color format (e.g., RGB) from raw CCD/CMOS data. The ISP (1516) is customizable for each sensor type and supports video frame rates for preview displays of captured digital images and for video recording modes. The ISP (1516) also includes, among other functionality, an image resizer, statistics collection functionality, and a boundary signal calculator. The 3A module (1518) includes functionality to support control loops for auto focus, auto white balance, and auto exposure by collecting metrics on the raw image data from the ISP (1516) or external memory.

The Video BE (1510) includes an on-screen display engine (OSD) (1520) and a video analog encoder (VAC) (1522). The OSD engine (1520) includes functionality to manage display data in various formats for several different types of hardware display windows and it also handles gathering and blending of video data and display/bitmap data into a single display window before providing the data to the VAC (1522) in YCbCr format. The VAC (1522) includes functionality to take the display frame from the OSD engine (1520) and format it into the desired output format and output signals required to interface to display devices. The VAC (1522) may interface to composite NTSC/PAL video devices, S-Video devices, digital LCD devices, high-definition video encoders, DVI/HDMI devices, etc.

The memory interface (1524) functions as the primary source and sink to modules in the Video FE (1508) and the Video BE (1510) that are requesting and/or transferring data to/from external memory. The memory interface (1524) includes read and write buffers and arbitration logic. In one or more embodiments of the invention, the Video FE (1508) and the Video BE (1510) are configured to perform compression of digital image data prior to transferring the data to external memory in accordance with a compression method described herein and to perform decompression of digital image data in accordance with a decompression method described herein when transferring the data from external memory.

The ICP (1502) includes functionality to perform the computational operations required for video encoding and other processing of captured images. The video encoding standards supported may include one or more of the JPEG standards, the MPEG standards, and the H.26x standards. In one or more embodiments of the invention, the ICP (1502) is configured to perform the computational operations of embodiments of the compression and decompression methods described herein.

In operation, to capture an image or video sequence, video signals are received by the video FE (1508) and converted to the input format needed to perform video encoding. The video data generated by the video FE (1508) is stored in then stored in external memory. Prior to storing the video data in external memory, the video data is compressed using a method for compression described herein. The video data is then encoded by a video encoder. During the encoding process, the video encoder reads the compressed video data from the external memory and the computations for encoding this video data are performed by the ICP (1502). As the compressed video data is read from the external memory, the video data is decompressed using a method for decompression described herein. Further, the video encoder stores reference frames in the external memory and reads the reference frames from the external memory as needed during the encoding process. The reference frames are compressed using a compression method as described herein prior to storage in external memory and decompressed using a corresponding decompression method as described herein when read from external memory. As the video data is encoded, the resulting encoded video data is stored in the external memory.

To display the encoded video sequence, the encoded video data is decoded by a video decoder, which compresses the reconstructed frames of the video data using a compression method as described herein and stores the compressed reconstructed frames in the external memory. The video BE (1510) then reads the compressed reconstructed frames from the external memory, decompresses the frames using a method for decompression as described here, and performs any needed post-processing for displaying the video data.

FIG. 16 is a block diagram of a digital system (e.g., a mobile cellular telephone) (1600) that may be configured to perform the methods described herein. The signal processing unit (SPU) (1602) includes a digital signal processor system (DSP) that includes embedded memory and security features. The analog baseband unit (1604) receives a voice data stream from handset microphone (1613a) and sends a voice data stream to the handset mono speaker (1613b). The analog baseband unit (1604) also receives a voice data stream from the microphone (1614a) and sends a voice data stream to the mono headset (1614b). The analog baseband unit (1604) and the SPU (1602) may be separate integrated circuits. In many embodiments, the analog baseband unit (1604) does not embed a programmable processor core, but performs processing based on configuration of audio paths, filters, gains, etc being setup by software running on the SPU (1602). In some embodiments, the analog baseband processing is performed on the same processor and can send information to it for interaction with a user of the digital system (1600) during a call processing or other processing.

The display (1620) may also display pictures and video streams received from the network, from a local camera (1628), or from other sources such as the USB (1626) or the memory (1612). The SPU (1602) may also send a video stream to the display (1620) that is received from various sources such as the cellular network via the RF transceiver (1606) or the camera (1626). The SPU (1602) may also send a video stream to an external video display unit via the encoder (1622) over a composite output terminal (1624). The encoder unit (1622) may provide encoding according to PAL/SECAM/NTSC video standards.

The SPU (1602) includes functionality to perform the computational operations required for video encoding and decoding. The video encoding standards supported may include, for example, one or more of the JPEG standards, the MPEG standards, and the H.26x standards. In one or more embodiments of the invention, the SPU (1602) is configured to perform the computational operations of one or more of the methods for compression and decompression of digital image data as described herein. Software instructions implementing the one or more methods may be stored in the memory (1612) and executed by the SPU (1602) as part of capturing and/or encoding of digital image data, e.g., pictures and video streams.

FIG. 17 shows a digital system (1700) (e.g., a personal computer) that includes a processor (1702), associated memory (1704), a storage device (1706), and numerous other elements and functionalities typical of digital systems (not shown). In one or more embodiments of the invention, a digital system may include multiple processors and/or one or more of the processors may be digital signal processors. The digital system (1700) may also include input means, such as a keyboard (1708) and a mouse (1710) (or other cursor control device), and output means, such as a monitor (1712) (or other display device). The digital system (1700) may also include an image capture device (not shown) that includes circuitry (e.g., optics, a sensor, readout electronics) for capturing still images and/or video sequences. The digital system (1700) may include a video encoder with functionality to perform embodiments of the methods as described herein. The digital system (1700) may be connected to a network (e.g., a local area network (LAN), a wide area network (WAN) such as the Internet, a cellular network, any other similar type of network and/or any combination thereof) via a network interface connection (not shown). Those skilled in the art will appreciate that these input and output means may take other forms.

Further, those skilled in the art will appreciate that one or more elements of the aforementioned digital system (1700) may be located at a remote location and connected to the other elements over a network. Further, embodiments of the invention may be implemented on a distributed system having a plurality of nodes, where each portion of the system and software instructions may be located on a different node within the distributed system. In one embodiment of the invention, the node may be a digital system. Alternatively, the node may be a processor with associated physical memory. The node may alternatively be a processor with shared memory and/or resources.

Software instructions to perform embodiments of the invention may be stored on a computer readable medium such as a compact disc (CD), a diskette, a tape, a file, memory, or any other computer readable storage device. The software instructions may be distributed to the digital system (1700) via removable computer readable media (e.g., floppy disk, optical disk, flash memory, USB key), via a transmission path from computer readable media on another digital system, etc.

While the invention has been described with respect to a limited number of embodiments, those skilled in the art, having benefit of this disclosure, will appreciate that other embodiments can be devised which do not depart from the scope of the invention as disclosed herein. For example, the methods for compression and decompression may also be used in a video decoder to compress and decompress reference frames during decoding. Accordingly, the scope of the invention should be limited only by the attached claims. It is therefore contemplated that the appended claims will cover any such modifications of the embodiments as fall within the true scope and spirit of the invention.

What is claimed is:

1. A method for processing digital image data comprising:
compressing a block of the digital image data to generate a compressed block wherein the compression threshold is (M×N×nrbits)/f wherein M is a width of the block, N is a height of the block, nr bits is a number of bits in a pixel, and f is a compression factor;
storing the uncompressed block in an external memory when a number of bits in the compressed block exceed a first compression threshold; and
storing the compressed block in the external memory when the number of bits in the compressed block does not exceeds the first compression threshold; and
wherein the first compression threshold is one of a plurality of compression thresholds, and
wherein the external memory comprises a compressed data buffer corresponding to each of the plurality of compression thresholds and an uncompressed data buffer, and
wherein storing the compressed block further comprises:
determining that the number of bits in the compressed block does not exceed a second compression threshold of the plurality of compression thresholds, wherein the second threshold is smaller than the first compression threshold;
storing the compressed block in the compressed data buffer corresponding to the second compression threshold responsive to the determining; and
setting a compression flag corresponding to the block to indicate that the compressed block is stored in the compressed data buffer corresponding to the second compression threshold, and wherein storing the block further comprises:
   storing the block in the uncompressed data buffer; and
   setting the compression flag corresponding to the block to indicate that the block is stored in the uncompressed data buffer.

2. The method of claim 1, wherein the compressed block is stored in a compressed buffer block in a compressed data buffer in the external memory and the uncompressed block is stored in an uncompressed buffer block in an uncompressed data buffer in the external memory.

3. The method of claim 2, further comprising:
   storing an uncompressed block marker in the compressed buffer block when the block is stored in the uncompressed buffer block in the uncompressed data buffer.

4. The method of claim 3, further comprising:
   storing a location indicator in the compressed buffer block, wherein the location indicator indicates a location of the uncompressed buffer block in the uncompressed data buffer.

5. The method of claim 2, further comprising:
   setting a compression flag corresponding to the block to indicate that the compressed block is stored in the compressed data buffer when the compressed block is stored in the compressed data buffer; and
   setting the compression flag to indicate that the block is stored in the uncompressed data buffer when the block is stored in the uncompressed data buffer.

6. The method of claim 2, wherein the compressed data buffer comprises a compressed buffer block corresponding to each block in the digital image data.

7. The method of claim 2, wherein the uncompressed data buffer comprises an uncompressed buffer block corresponding to each block in the digital image data.

8. The method of claim 1,
   wherein the first compression threshold is one of a plurality of compression thresholds, and
   wherein storing the compressed block further comprises setting a compression flag corresponding to the block to indicate that that the number of bits in the compressed block does not exceed a second compression threshold of the plurality of compression thresholds, wherein the second compression threshold is smaller than the first compression threshold, and
   wherein storing the block further comprises setting the compression flag corresponding to the block to indicate that the block is uncompressed.

9. The method of claim 3, further comprising:
   reading the compressed buffer block from compressed data buffer;
   reading the uncompressed buffer block in the uncompressed data buffer that contains the block when the uncompressed block marker is stored in the compressed buffer block; and
   decompressing the compressed block stored in the compressed buffer block when the uncompressed block marker is not stored in the compressed buffer block.

10. The method of claim 5, further comprising:
    reading the uncompressed buffer block in the uncompressed data buffer that contains the block when the compression flag indicates that the block is stored in the uncompressed data buffer; and
    reading the compressed buffer block in the compressed data buffer that contains the compressed block and decompressing the compressed block when the compression flag indicates that the compressed block is stored in the compressed data buffer.

11. The method of claim 1, further comprising:
    reading a number of bits corresponding to the second compression threshold from the compressed data buffer corresponding to the second compression threshold when the compression flag corresponding to the block indicates that the compressed block is stored in the compressed data buffer, wherein the number of bits comprises the compressed block, and decompressing the compressed block; and
    reading the block from the uncompressed data buffer when the compression flag corresponding to the block indicates that the block is stored in the uncompressed data buffer.

12. The method of claim 8, further comprising:
    reading a number of bits corresponding to the second compression threshold from the external memory when the compression flag corresponding to the block indicates that the number of bits in the compressed block does not exceed the second compression threshold, wherein the number of bits comprises the compressed block, and decompressing the compressed block; and
    reading the block from the external memory when the compression flag corresponding to the block indicates that the block is uncompressed.

13. A digital system comprising:
    an external memory; and
    a data compression component configured to process digital image data by compressing a block of the digital image data to generate a compressed block;
    storing the uncompressed block in the external memory when a number of bits in the compressed block exceed a first compression threshold;
    and
    storing the compressed block in the external memory when the number of bits in the compressed block does not exceeds the first compression threshold; and
    wherein the first compression threshold is one of a plurality of compression thresholds, and
    wherein the external memory comprises a compressed data buffer corresponding to each of the plurality of compression thresholds and an uncompressed data buffer, and
    wherein storing the compressed block further comprises:
    determining that the number of bits in the compressed block does not exceed a second compression threshold of the plurality of compression thresholds, wherein the second compression threshold is smaller than the first compression threshold;
    storing the compressed block in the compressed data buffer corresponding to the second compression threshold responsive to the determining; and
    setting a compression flag corresponding to the block to indicate that the compressed block is stored in the compressed data buffer corresponding to the second compression threshold, and
    wherein storing the block further comprises:
    storing the block in the uncompressed data buffer; and
    setting the compression flag corresponding to the block to indicate that the block is stored in the uncompressed data buffer.

14. The digital system of claim 13, wherein the external memory comprises a compressed data buffer and an uncompressed data buffer, and wherein the compressed block is stored in a compressed buffer block in the compressed data buffer and the uncompressed block is stored in an uncompressed buffer block in the uncompressed data buffer.

15. The digital system of claim 14, wherein the data compression component is further configured to process digital image data by:
   storing an uncompressed block marker in the compressed buffer block when the block is stored in the uncompressed buffer block in the uncompressed data buffer.

16. The digital system of claim 15, wherein the data compression component is further configured to process digital image data by:
   storing a location indicator in the compressed buffer block, wherein the location indicator indicates a location of the uncompressed buffer block in the uncompressed data buffer.

17. The digital system of claim 14, wherein the data compression component is further configured to process digital image data by:
   setting a compression flag corresponding to the block to indicate that the compressed block is stored in the compressed data buffer when the compressed block is stored in the compressed data buffer; and
   setting the compression flag to indicate that the block is stored in the uncompressed data buffer when the block is stored in the uncompressed data buffer.

18. The digital system of claim 15, further comprising:
   a data decompression component configured to process digital image data by
      reading the compressed buffer block from compressed data buffer;
      reading the uncompressed buffer block in the uncompressed data buffer that contains the uncompressed block when the uncompressed block marker is stored in the compressed buffer block; and
      decompressing the compressed block stored in the compressed buffer block when the uncompressed block marker is not stored in the compressed buffer block.

19. The digital system of claim 17, further comprising:
   a data decompression component configured to process digital image data by
      reading the uncompressed buffer block in the uncompressed data buffer that contains the block when the compression flag corresponding to the block indicates that the block is stored in the uncompressed data buffer; and
      reading the uncompressed buffer block in the uncompressed data buffer that contains the compressed block and decompressing the compressed block when the compression flag corresponding to the block indicates that the block is stored in the compressed data buffer.

20. The digital system of claim 19, further comprising:
   a data decompression component configured to process digital image data by
      reading a number of bits corresponding to the second compression threshold from the compressed data buffer corresponding to the second compression threshold when the compression flag corresponding to the block indicates that the compressed block is stored in the compressed data buffer, wherein the number of bits comprises the compressed block, and decompressing the compressed block; and
      reading the block from the uncompressed data buffer when the compression flag corresponding to the block indicates that the block is stored in the uncompressed data buffer.

21. The digital system of claim 13,
   wherein the first compression threshold is one of a plurality of compression thresholds, and
   wherein storing the compressed block further comprises setting a compression flag corresponding to the block to indicate that that the number of bits in the compressed block does not exceed a second compression threshold of the plurality of compression thresholds, wherein the second compression threshold is smaller than the first compression threshold, and
   wherein storing the block further comprises setting the compression flag corresponding to the block to indicate that the block is uncompressed.

22. The method of claim 21, further comprising:
   a data decompression component configured to process digital image data by
      reading a number of bits corresponding to the second compression threshold from the external memory when the compression flag corresponding to the block indicates that the number of bits in the compressed block does not exceed the second compression threshold, wherein the number of bits comprises the compressed block, and decompressing the compressed block; and
      reading the block from the external memory when the compression flag corresponding to the block indicates that the block is uncompressed.

* * * * *